(12) United States Patent
Maddala et al.

(10) Patent No.: US 9,779,189 B2
(45) Date of Patent: Oct. 3, 2017

(54) SYSTEM AND METHOD FOR SIMULATION AND DESIGN OF DISCRETE DROPLET MICROFLUIDIC SYSTEMS

(71) Applicant: Texas Tech University System, Lubbock, TX (US)

(72) Inventors: Jeevan Maddala, Lubbock, TX (US); Raghunathan Rengaswamy, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 14/905,568

(22) PCT Filed: Jul. 11, 2014

(86) PCT No.: PCT/US2014/046266
§ 371 (c)(1),
(2) Date: Jan. 15, 2016

(87) PCT Pub. No.: WO2015/009553
PCT Pub. Date: Jan. 22, 2015

(65) Prior Publication Data
US 2016/0154908 A1   Jun. 2, 2016

Related U.S. Application Data

(60) Provisional application No. 61/847,114, filed on Jul. 17, 2013.

(51) Int. Cl.
| G06F 17/50 | (2006.01) |
| G06F 17/30 | (2006.01) |
| G06N 3/08  | (2006.01) |

(52) U.S. Cl.
CPC ...... *G06F 17/5009* (2013.01); *G06F 17/3053* (2013.01); *G06F 17/30294* (2013.01);
(Continued)

(58) Field of Classification Search
None
See application file for complete search history.

(56) References Cited

U.S. PATENT DOCUMENTS

| 6,500,323 B1 | 12/2002 | Chow et al. |
| 7,062,418 B2 | 6/2006  | Lee et al.  |

(Continued)

FOREIGN PATENT DOCUMENTS

| WO | 2007114794 A1 | 10/2007 |
| WO | 2009050512 A2 | 4/2009  |

OTHER PUBLICATIONS

T.Y. Ho. K. Chakrabarty, and P. Pop, "Digital Microfluidic Biochips: Recent Research and Emerging Challenges", pp. 335-343, 2011 ACM.*

(Continued)

*Primary Examiner* — Kibrom K Gebresilassie
(74) *Attorney, Agent, or Firm* — Daniel J. Chalker; Edwin S. Flores; Chalker Flores, LLP

(57) ABSTRACT

A computerized method for designing a discrete droplet microfluidic system: (a) provides an initial set of droplet based networks; (b) codes each droplet based network into a data structure such that all the data structures form a current set of data structures; (c) creates new data structures by performing one or more genetic operators on the current set of data structures; (d) adds new data structures to the current set of data structures; (e) creates a new set of data structures that satisfies one or more design parameters; (f) replaces the current set of data structures with the new set of data structures; (g) repeats steps (c), (d), (e) and (f) until the new set of data structures has been created a third number of times; and (h) displays/outputs the current set of data structures as possible designs for the discrete droplet microfluidic system to one or more output devices.

25 Claims, 21 Drawing Sheets

(52) U.S. Cl.
CPC ........ *G06F 17/509* (2013.01); *G06F 2217/16* (2013.01); *G06N 3/086* (2013.01)

(56) References Cited

U.S. PATENT DOCUMENTS

| | | | | |
|---|---|---|---|---|
| 2006/0226012 | A1* | 10/2006 | Kanagasabapathi | B03C 5/028 204/547 |
| 2007/0011114 | A1* | 1/2007 | Chen | G06N 3/086 706/15 |
| 2008/0065575 | A1* | 3/2008 | Szathmary | G06N 3/086 706/27 |
| 2011/0114190 | A1 | 5/2011 | Wen et al. | |
| 2012/0003658 | A1 | 1/2012 | Davies et al. | |
| 2013/0161193 | A1 | 6/2013 | Jacobs et al. | |
| 2014/0030800 | A1* | 1/2014 | Moses | G01N 21/64 435/288.7 |
| 2014/0045712 | A1* | 2/2014 | Link | C12Q 1/686 506/9 |
| 2014/0195215 | A1* | 7/2014 | Chen | G06F 17/5009 703/10 |
| 2014/0311750 | A1* | 10/2014 | Heneman | E21B 43/16 166/369 |
| 2015/0134276 | A1* | 5/2015 | Mantegazza | G01F 1/34 702/47 |

OTHER PUBLICATIONS

T. Y. Ho. K. Chakrabarty, and P. Pop, "Digital Microfluidic Biochips: Recent Research and Emerging Challenges", pp. 335-343, 2011 ACM.*
J. Maddala, B. Srinivasan, S. S. Bithi, S. A. Vanapalli, and R. Rengaswamy, "Design of a Model-based Feedback Controller for Active Sorting and Synchronization of Droplets in a Microfluidic Loop" pp. 2120-2130, 2011.*
International Search Report and Written Opinion PCT/US2014/046266 [KIPO] dated Nov. 7, 2014.
Boukellal, H et al Simple, Robust storage of drops and fluids in a microfluidic device. Lab Chip 2008;9:331-338. doi:10.1039/b808579j.
Brouzes, E. et al. "Droplet microfluidic technology for single-cell high-throughput screening" Proceedings of the National Academy of Sciences 2009, 106, 14195-14200.
Christopher, GF et al Coalscence and splitting of confined droplets at microfluidic junctions. Lab Chip 2009;9:1102-1109. doi:10.1039/b813062k.
Cristobal, G et al "Microfluidic bypass for efficient passive regulation of droplet traffic at a junction" Applied Physics Letters 2006;89(034104):1-3. doi:10.1063/1.2221929.
Cybulski, O et al "Dynamic memory in a microfluidic system of droplets traveling through a simple network of microchannels" Lab Chip 2009;10:484-493. doi:10.1039/b912988j.
Delamarche, E. et al. "Microfluidic networks for chemical patterning of substrates: design and application to bioassays" Journal of the American Chemical Society 1998, 120, 500-508.
Dendukuri, D. et al. "The synthesis and assembly of polymeric microparticles using microfluidics" Advanced Materials 2009, 21, 4071-4086.
Dicarlo, D. et al. "Dynamic single-cell analysis for quantitative biology" Analytical chemistry 2006, 78, 7918-7925.
Dittrich, P. S. et al. "Lab-on-a-chip: microfluidics in drug discovery" Nature Reviews Drug Discovery May 2006, 210-218.
Epstein, IR "Can droplets and bubbles think?" Science 2007;315(5813):775-776.
Fair, R. B. et al. "Chemical and biological applications of digital-microfluidic devices" Design & Test of Computers, IEEE 2007, 24, 10-24.
Garrard, A et al. "Mass exchange network synthesis using genetic algorithms" Computers & chemical engineering 1998;22(12):1837-1850.

Gay, B. et al. "The solution of pipe network problems" Chemical Engineering Science 1971, 26, 109-123.
Gleichmann, N. et al. "System Simulation for Microfluidic Design Automation of Lab-On-A-Chip Devices," 15th International Conference on Miniaturized Systems for Chemistry and Life Sciences. http://rsc.li/T21ltw Oct. 2, 2011.
Hamady, M. et al. "Error-correcting barcoded primers for pyrosequencing hundreds of samples in multiplex" Nature methods May 2008, 235-237.
Hansen, C. et al. "Microfluidics in structural biology: smaller, faster . . . better" Current Opinion in Structural Biology 2003, 13, 538-544.
Hatakeyama, T et al "Microgram-scale testing of reaction conditions in solution using nanoliter plugs in microfluidics with detection by MALDI-MS" J Am Chem Soc 2006;128:2518-2519. doi:10.1021/ja057720w.
Hillestad, M. et al. "Dynamic simulation of chemical engineering systems by the sequential modular approach" Computers & chemical engineering Oct. 1986, 377-388.
Ho, TY et al "Digital microfluidic biochips: Recent research and emerging challenges" In: Hardware/Software Codesign and System Synthesis (CODES+ISSS), 2011 Proceedings of the 9th International Conference on. 2011:335-343.
Hong, J. et al. "Micro- and nanofluidic systems for high-throughput biological screening" Drug discovery today 2009, 14, 134-146.
Jin, BJ et al "Droplet merging in a straight microchannel using droplet size or viscosity difference" J Micromech Microeng 2010;20(035003):1-3. doi:10.1088/0960-1317/20/3/035003.
Kelly, B. T. et al. "Miniaturizing chemistry and biology in microdroplets" Chemical Communications 2007, 1773-1788.
Laval, P et al "Microfluidic droplet method for nucleation kinetics measurements" Langmuir 2009;25(3):1836-1841. doi:10.1021/la802695r.
Lee, M. et al. "Computer aided design method and system for developing a microfluidic system" Google Patents: 2006.
Maddala, J. et al. "Droplet digital signal generation in Microfluidic Networks using Model Predictive Control" Journal of Process Control 2012.
Maddala, J. et al. "Design of multi-functional microfluidic ladder networks to passively control droplet spacing using genetic algorithms" Computers and Chemical Engineering 60 (2014) 413-425.
Maddala, J et al "Traffic of pairs of drops in microfluidic ladder networks with fore-aft structural asymmetry" Microfluidics and Nanofluidics 2012;:1-810.1007/s10404-012-1054-z; URL http://dx.doi.org/10.1007/s10404-012-1054-z.
Maddala, J. et al. "Design of multi-functional ladder networks using evolutionary algorithms" submitted to Elsevier Dec. 17, 2012.
Mark, D. et al. "Microfluidic lab-on-a-chip platforms: requirements, characteristics and applications" Chemical Society Reviews 2010, 39, 1153-1182.
Mott, D. et al. "Designing Microfluidic Components for Enhanced Surface Delivery Using a Genetic Algorithm Search," 46th AIAA Aerospace Sciences Meeting and Exhibit. http://bit.ly/TgSUq3 Jan. 7, 2008.
Pamula, V. et al. "In a droplet-based lab-on-a-chip for colorimetric detection of nitroaromatic explosives" IEEE: 2005; pp. 722-725.
Prakash, M et al "Microfluidic bubble logic" Science 2007;315:832-835. doi:10.1126/science.1136907.
Ravagnani, M et al. "Heat exchanger network synthesis and optimisation using genetic algorithm" Applied Thermal Engineering 2005;25(7):1003-1017.
Schindler, M et al "Droplet traffic microfluidic networks: A simple model for understanding and designing" Physical Review Letters 2008;100(044501):o pp. 1-4. doi:10.1103/PhysRevLett.100.044501.
Sessoms, DA et al "Complex dynamics of droplet traffic in a bifurcating microfluidic channel: Periodicity, multistability, and selection rules" Phys Rev Lett 2010;105:154501.
Shim, J et al "Control and measurement of the phase behavior of aqueous solutions using microfluidics" J Am Chem Soc 2007;129:8825-8835. doi:10.1021/ja071820f.
Solvas Casadevall, I et al. "Droplet microfluidics: recent developments and future applications" Chemical Communications 2011, 47, 1936-1942.

(56) References Cited

OTHER PUBLICATIONS

Song, K et al "Modeling of droplet traffic in interconnected microfluidic ladder devices" Electrophoresis 2012;33 (3):411-418.

Song, H. et al. "Reactions in droplets in microfluidic channels" Angewandte chemie international edition 2006, 45, 7336-7356.

Su, F. et al. "Architectural-level synthesis of digital microfluidics-based biochips," ICCAD '04 Proceedings of the 2004 IEEE/ACM International Conference on Computer-Aided Design. http://bit.ly/R75rJS 2004.

Su, F et al "Microfluidics-based biochips: Technology issues, implementation platforms, and design-automation challenges" Computer-Aided Design of Integrated Circuits and Systems, IEEE Transactions on 2006;25(2):211-223. doi:10.1109/TCAD.2005.855956.

Vanapalli, S. A. et al. "Microfluidics as a functional tool for cell mechanics" Biomicrolluidics Mar. 2009.

Walters, G et al. "Optimal Design of Water Systems using Genetic Algorithms and Other Evolution Programs" Keynote paper in Hydraulic Engineering Software V vol. 1: Water Resources and Distribution, WR Blain and KL Ktsifarakis. 1994.

Weibel, D. B. et al. "Applications of microfluidics in chemical biology" Current Opinion in Chemical Biology Oct. 2006, 584-591.

Whitesides, G. M. "The origins and the future of microfluidics" Nature 2006, 442, 368-373.

Whitley, D. "A genetic algorithm tutorial" Statistics and computing 1994;4(2):65-85.

Ye, N. et al. "Cell-based high content screening using an integrated microfluidic device" Lab Chip Jul. 2007, 1696-1704.

Zare, R.N. et al., "Microfluidic Platforms for Single-Cell Analysis" Annu. Rev. Biomed. Eng. Dec. 2010. :187-201.

Man, K. F. et al. "Genetic algorithms: concepts and applications [in engineering design]" Industrial Electronics, IEEE Transactions on 1996, 43, 519-534.

Lee, D. H. et al. "Microbridge structures for uniform interval control of flowing droplets in microfluidic networks" Biomicrofluidics May 2011, 034117.

* cited by examiner

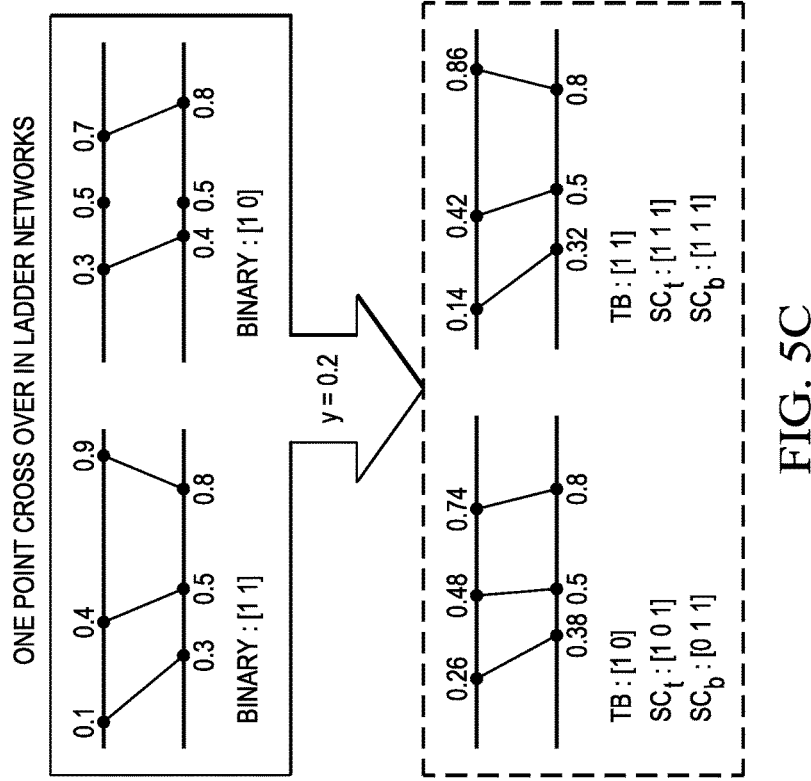
FIG. 5A
FIG. 5C
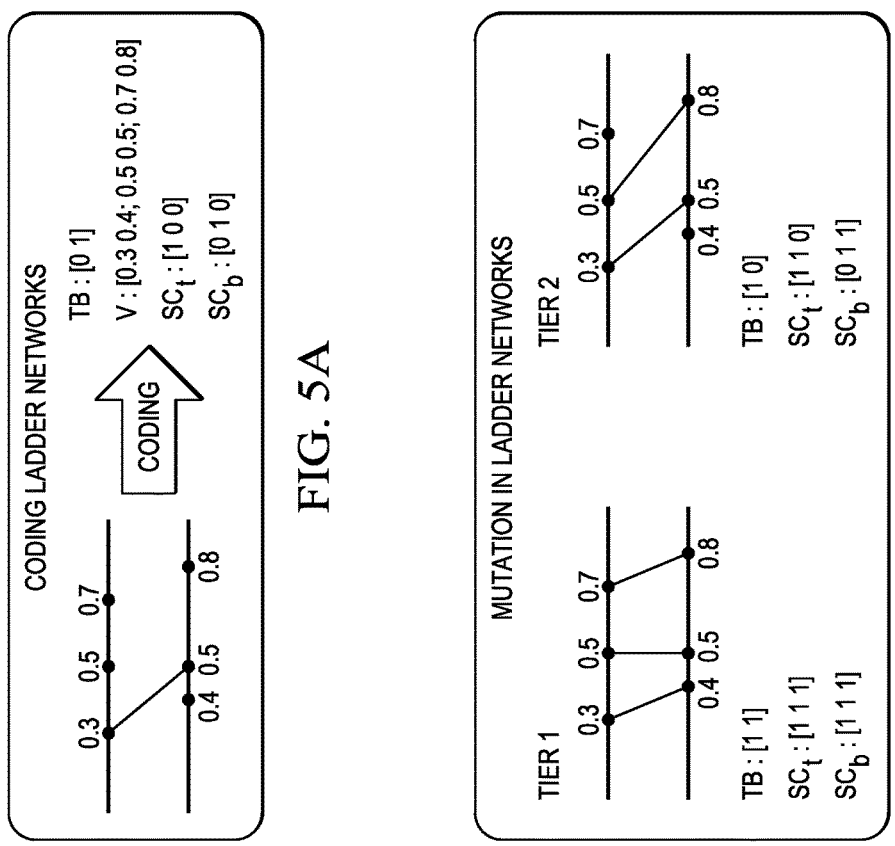
FIG. 5B

FIG. 12A
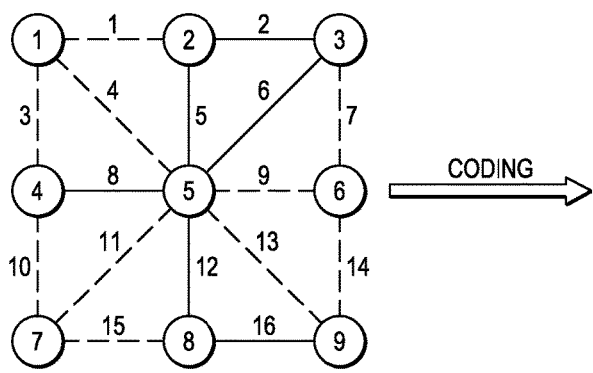
FIG. 12B
| NODE BRANCH | 1 | 2 | ∘ ∘ ∘ | 9 |
|---|---|---|---|---|
| 1 | 0 | 0 | ∘ ∘ ∘ | 0 |
| 2 | 0 | -1 | ∘ ∘ ∘ | 0 |
| ∘∘∘ | ∘∘∘ | ∘∘∘ | ∘ ∘ ∘ | ∘∘∘ |
| 16 | 0 | 0 | 0 | 1 |
CODING
TRANSFORM
TRANSFORM
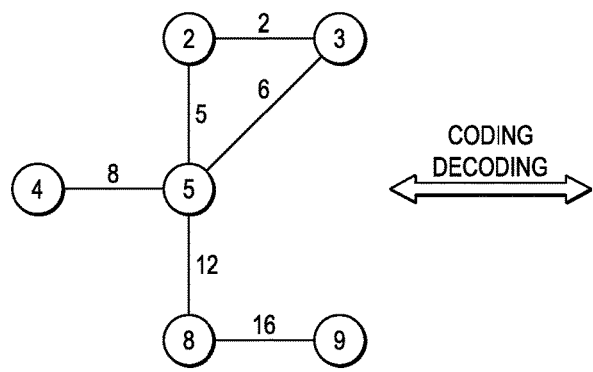
FIG. 12C
CODING
DECODING
| NODE BRANCH | 2 | 3 | 4 | 5 | 8 | 9 |
|---|---|---|---|---|---|---|
| 2 | -1 | 1 | 0 | 0 | 0 | 0 |
| 5 | -1 | 0 | 0 | 1 | 0 | 0 |
| 6 | 0 | 1 | 0 | -1 | 0 | 0 |
| 8 | 0 | 0 | -1 | 1 | 0 | 0 |
| 12 | 0 | 0 | 0 | -1 | 1 | 0 |
| 16 | 0 | 0 | 0 | 0 | -1 | 1 |
FIG. 12D

SYSTEM AND METHOD FOR SIMULATION AND DESIGN OF DISCRETE DROPLET MICROFLUIDIC SYSTEMS

CROSS REFERENCE TO RELATED APPLICATIONS

This application claims priority to, and is the National Phase of International Application No. PCT/US2014/046266, filed on Jul. 11, 2014, which claims the benefit under 35 U.S.C. §119(e) of U.S. Provisional Application No. 61/847,114, filed Jul. 17, 2013. All of which are hereby incorporated by reference in their entirety.

FIELD OF THE INVENTION

The present invention relates generally to the field of computational systems and, more particularly, to a system and method for simulation and design of discrete droplet microfluidic systems.

BACKGROUND OF THE INVENTION

Discrete droplet microfluidic systems—where droplets move through a bulk fluid in interconnected network of channels—are a rapidly expanding technology with exciting applications that cross-cut several scientific and engineering endeavors [14,31-39]. Millions of very small volume droplets in the nanoliter range can be reproducibly generated and processed in these droplet-based microfluidic systems. This allows for unparalleled control over small volumes of materials in time and space, which has revolutionized conventional biochemical analysis [1,2]. Recent advances in this area have led to the development of devices with basic functionalities such as sorting [3,4,5], merging [6], synchronization[7] and storing [8,9,10]. Using these basic devices it is now possible to design massively parallelized large-scale architectures for lab-on-chip applications. The current state-of-the-art is that these devices are developed using a bottom up approach i.e. by rigorous experimentation to find optimal designs for a given objective.

One important consequence of this control is the ability to investigate the physics and chemistry of materials at a single entity level. This can lead to transformative science where, for example, each cell from a large population of cells could be analyzed for cancer and other possible diseases [40-42]. This also makes high-throughput chemistry possible since one could conceivably ensure that every molecule undergoes the same "processing experience". Microfluidic sensors with detection specificity in the parts per billion scales [43-45] can be imagined.

While the promise of this field of science is enormous, ultimate realization of this potential depends on engineering devices that have precise and multiple functionalities while being robust to the inevitable design and environmental uncertainties. While individual processor designs are being generated at a frenetic pace, identifying designs that efficiently integrate these processors in large-scale droplet-based microfluidic platforms is still very much an emerging science. Consider a case where one wants to know if there exists, for a particular application, a large-scale droplet-based microfluidic platform that offers multiple desired functions with a small footprint? While this in itself is a difficult question to answer routinely, a more involved question is, even if such a design exists, how much of this multi-functionality is retained in the face of inevitable experimental uncertainties? While it might certainly be possible to formulate answers to such questions with minimal experimentation in fields where decades of prior design knowledge exists, this is rather unlikely in newer areas such as droplet-based microfluidics.

Designing these devices in order to achieve specific functionality, such as spatial and temporal control of the droplets, is a laborious process that involves several experimental trials. Microfluidic ladder network is one such device that has shown to passively control droplet spacing. It is important to optimize design parameters such as number of bypasses, their orientation and spacing between them to realize all the functionalities offered by these devices.

Several papers have studied the ladder network in detail. The ladder networks are important in their own right and have been used in microfluidic networks for synchronization. Synchronizer is an operation used to maintain a zero or relatively small time difference between two events such as droplets exiting two arms of a ladder. Droplets entering the two arms of the ladder at different times but synchronized by the time they leave the ladder. The bypasses (i.e. steps of the ladder) allow the bulk fluid to flow through but forbid the passage of droplets. While the underlying physical principle of the synchronizer is deceptively simple, yet trying to design a robust synchronizer with minimal device foot-print under unavoidable experimental constraints is not trivial. For example in the pursuit of a robust synchronizer, one might ask what is the optimal number of bypasses needed and how does this number depend on droplet hydrodynamic resistance and velocities. What degree of experimental uncertainties can be tolerated and yet achieve acceptable synchronizer functionality? Are there alternative and more efficient structural configurations for the synchronizer than that implemented by Prakash and Gershenfeld [37]? Is it possible to design a ladder network for multiple functionalities such as input delay dependent behavior? Are there any advantages that can be accrued by slanting the arms of the ladder either in the forward or backward directions? To answer these questions, currently neither systematic efforts have been devoted nor rational approaches have been developed.

SUMMARY OF THE INVENTION

The present invention provides a tool that provides: (i) modeling droplet microfluidic platforms using nodal analysis, and (ii) formulation of a custom genetic algorithm to design large scale droplet microfluidic systems.

More specifically, the present invention provides a computerized method for designing a discrete droplet microfluidic system that includes the steps of: (a) providing an initial set of droplet based networks containing a first number of droplet based networks, wherein each droplet based network comprises one or more inlets, one or more outlets, two or more channels connected between the one or more inlets and the one or more outlets, and one or more bypass channels connected between the two or more channels; (b) coding each droplet based network into a data structure such that all the data structures form a current set of data structures; (c) creating one or more new data structures by performing one or more genetic operators on one or more selected data structures from the current set of data structures; (d) adding the one or more new data structures to the current set of data structures; (e) creating a new set of data structures that satisfies one or more design parameters for the discrete droplet microfluidic system and contains at least a second number of data structures selected from the current set of data structures, wherein the second number is less than a total number of data structures within the current set of data structures; (f) replacing the current set of data structures with the new set of data structures; (g) repeating steps (c), (d), (e) and (f) until the new set of data structures has been created a third number of times; and (h) displaying or outputting the current set of data structures as possible designs for the discrete droplet microfluidic system to one or more output devices. Steps (c), (d), (e), (f), (g) and (h) are executed by one or more processors communicably coupled to the one or more output devices.

In addition, the present invention provides a non-transitory computer readable medium encoded with a computer program for designing a discrete droplet microfluidic system that when executed by one or more processors perform the steps that include: (a) creating one or more new data structures by performing one or more genetic operators on one or more selected data structures from a current set of data structures, wherein the current set of data structures comprise an initial set of droplet based networks containing a first number of droplet based networks that have been coded into the current set of data structures, and each droplet based network comprises one or more inlets, one or more outlets, two or more channels connected between the one or more inlets and the one or more outlets, and one or more bypass channels connected between the two or more channels; (b) adding the one or more new data structures to the current set of data structures; (c) creating a new set of data structures that satisfies one or more design parameters for the discrete droplet microfluidic system and contains at least a second number of data structures selected from the current set of data structures, wherein the second number is less than a total number of data structures within the current set of data structures; (d) replacing the current set of data structures with the new set of data structures; (e) repeating steps (a), (b), (c) and (d) until the new set of data structures has been created a third number of times; and (f) displaying or outputting the current set of data structures as possible designs for the discrete droplet microfluidic system to one or more output devices communicably coupled to the one or more processors.

Moreover, the present invention provides an apparatus for designing a discrete droplet microfluidic system that includes one or more processors, a memory communicably coupled to the one or more processors, and one or more output devices communicably coupled to the one or more processors. The one or more processors perform the steps of: (a) creating one or more new data structures by performing one or more genetic operators on one or more selected data structures from a current set of data structures, wherein the current set of data structures comprise an initial set of droplet based networks containing a first number of droplet based networks that have been coded into the current set of data structures, and each droplet based network comprises one or more inlets, one or more outlets, two or more channels connected between the one or more inlets and the one or more outlets, and one or more bypass channels connected between the two or more channels: (b) adding the one or more new data structures to the current set of data structures; (c) creating a new set of data structures that satisfies one or more design parameters for the discrete droplet microfluidic system and contains at least a second number of data structures selected from the current set of data structures, wherein the second number is less than a total number of data structures within the current set of data structures; (d) replacing the current set of data structures with the new set of data structures; (e) repeating steps (a), (b), (c) and (d) until the new set of data structures has been created a third number of times; and (f) displaying or outputting the current set of data structures as possible designs for the discrete droplet microfluidic system to one or more output devices.

Furthermore, the present invention provides a computerized method for designing a discrete droplet microfluidic system that includes the steps of: (A) providing an initial set of droplet based networks containing a first number of droplet based networks, wherein each droplet based network comprises one or more inlets, one or more outlets, two or more channels connected between the one or more inlets and the one or more outlets, and one or more bypass channels connected between the two or more channels; (B) coding each droplet based network into a data structure such that all the data structures form a current set of data structures, and initializing a generation counter; (C) creating one or more new data structures by: (1) calculating a first probability, (2) if the first probability is less than or equal to a first specified probability, (a) selecting one of the data structures within the current set of data structures, (b) if the generation counter is less than a fifth number of generations, creating one of the new data structures by performing a first tier mutation genetic operator on the selected data structure, and (c) if the generation counter is equal to or greater than the fifth number of generations, (i) calculating a second probability, (ii) if the second probability is less than or equal to a second specified probability, creating one of the new data structures by performing a first tier mutation genetic operator on the selected data structure, and (iii) if the second probability is greater than the second specified probability, creating one of the new data structures by performing a second tier mutation genetic operator on the selected data structure, (3) if the first probability is greater than the first specified probability, (a) randomly selecting a first data structure and a second data structure from the current set of data structures, (b) creating two of the new data structures by performing a one point crossover genetic operator on the selected first data structure and the selected second data structure, (4) adding the new data structure(s) to the current set of data structures, and (5) whenever the current set of data structures contains less than a fourth number of data structures, repeating steps (C)(1) through (C)(4); (D) creating a new set of data structures that satisfies one or more design parameters for the discrete droplet microfluidic system and contains at least a second number of data structures, wherein the second number of data structures is less than a total number of data structures within the current set of data structures and the new set of data structures comprise a first group of data structures, a second group of data structures and a third group of data structures by: (1) determining a fitness score and a diversity score for each data structure in the current set of data structures, (2) selecting the first group of data structures from the current set of data structures based a highest ranking of the fitness scores for the data structures in the current set of data structures, (3) selecting the second group of data structures from the current set of data structures based on a combination of the fitness score and the diversity score for the data structures in the current set of data structures, (4) randomly selecting the third group of data structures from the current set of data structures, and (5) incrementing the generation counter; (E) wherever the generation counter is less than a third number of generations, replacing the current set of data structures with the new set of data structures, and repeating steps (C) and (D); and (F) wherever the generation counter is equal to the third number of generations, displaying or outputting the current set of data structures as possible designs for the discrete droplet microfluidic system to one or more output devices. Steps (C), (D), (E) and (F) are executed by one or more processors communicably coupled to the one or more output devices.

The present invention also provides a non-transitory computer readable medium encoded with a computer program for designing a discrete droplet microfluidic system that when executed by one or more processors perform the steps that include: (A) creating one or more new data structures from a current set of data structures, wherein the current set of data structures comprise an initial set of droplet based networks containing a first number of droplet based networks that have been coded into the current set of data structures, and each droplet based network comprises one or more inlets, one or more outlets, two or more channels connected between the one or more inlets and the one or more outlets, and one or more bypass channels connected between the two or more channels, the one or more new data structures created by: (1) calculating a first probability, (2) if the first probability is less than or equal to a first specified probability, (a) selecting one of the data structures within the current set of data structures, (b) if the generation counter is less than a fifth number of generations, creating one of the new data structures by performing a first tier mutation genetic operator on the selected data structure, and (c) if the generation counter is equal to or greater than the fifth number of generations, (i) calculating a second probability, (ii) if the second probability is less than or equal to a second specified probability, creating one of the new data structures by performing a first tier mutation genetic operator on the selected data structure, and (iii) if the second probability is greater than the second specified probability, creating one of the new data structures by performing a second tier mutation genetic operator on the selected data structure, (3) if the first probability is greater than the first specified probability, (a) randomly selecting a first data structure and a second data structure from the current set of data structures, (b) creating two of the new data structures by performing a one point crossover genetic operator on the selected first data structure and the selected second data structure, (4) adding the new data structure(s) to the current set of data structures, and (5) whenever the current set of data structures contains less than a fourth number of data structures, repeating steps (A)(1) through (A)(4); (B) creating a new set of data structures that satisfies one or more design parameters for the discrete droplet microfluidic system and contains at least a second number of data structures, wherein the second number of data structures is less than a total number of data structures within the current set of data structures and the new set of data structures comprise a first group of data structures, a second group of data structures and a third group of data structures by: (1) determining a fitness score and a diversity score for each data structure in the current set of data structures, (2) selecting the first group of data structures from the current set of data structures based a highest ranking of the fitness scores for the data structures in the current set of data structures, (3) selecting the second group of data structures from the current set of data structures based on a combination of the fitness score and the diversity score for the data structures in the current set of data structures, (4) randomly selecting the third group of data structures from the current set of data structures, and (5) incrementing the generation counter; (C) wherever the generation counter is less than a third number of generations, replacing the current set of data structures with the new set of data structures, and repeating steps (A) and (B); and (D) wherever the generation counter is equal to the third number of generations, displaying or outputting the current set of data structures as possible designs for the discrete droplet microfluidic system to one or more output devices communicably coupled to the one or more processors.

In addition, the present invention provides an apparatus for designing a discrete droplet microfluidic system that includes one or more processors, a memory communicably coupled to the one or more processors, and one or more output devices communicably coupled to the one or more processors. The one or more processors perform the steps of: (A) creating one or more new data structures from a current set of data structures, wherein the current set of data structures comprise an initial set of droplet based networks containing a first number of droplet based networks that have been coded into the current set of data structures, and each droplet based network comprises one or more inlets, one or more outlets, two or more channels connected between the one or more inlets and the one or more outlets, and one or more bypass channels connected between the two or more channels, the one or more new data structures created by: (1) calculating a first probability, (2) if the first probability is less than or equal to a first specified probability, (a) selecting one of the data structures within the current set of data structures, (b) if the generation counter is less than a fifth number of generations, creating one of the new data structures by performing a first tier mutation genetic operator on the selected data structure, and (c) if the generation counter is equal to or greater than the fifth number of generations, (i) calculating a second probability, (ii) if the second probability is less than or equal to a second specified probability, creating one of the new data structures by performing a first tier mutation genetic operator on the selected data structure, and (iii) if the second probability is greater than the second specified probability, creating one of the new data structures by performing a second tier mutation genetic operator on the selected data structure, (3) if the first probability is greater than the first specified probability, (a) randomly selecting a first data structure and a second data structure from the current set of data structures, (b) creating two of the new data structures by performing a one point crossover genetic operator on the selected first data structure and the selected second data structure, (4) adding the new data structure(s) to the current set of data structures, and (5) whenever the current set of data structures contains less than a fourth number of data structures, repeating steps (A)(1) through (A)(4); (B) creating a new set of data structures that satisfies one or more design parameters for the discrete droplet microfluidic system and contains at least a second number of data structures, wherein the second number of data structures is less than a total number of data structures within the current set of data structures and the new set of data structures comprise a first group of data structures, a second group of data structures and a third group of data structures by: (1) determining a fitness score and a diversity score for each data structure in the current set of data structures, (2) selecting the first group of data structures from the current set of data structures based a highest ranking of the fitness scores for the data structures in the current set of data structures, (3) selecting the second group of data structures from the current set of data structures based on a combination of the fitness score and the diversity score for the data structures in the current set of data structures, (4) randomly selecting the third group of data structures from the current set of data structures, and (5) incrementing the generation counter; (C) wherever the generation counter is less than a third number of generations, replacing the current set of data structures with the new set of data structures, and repeating steps (A) and (B); and (D)

wherever the generation counter is equal to the third number of generations, displaying or outputting the current set of data structures as possible designs for the discrete droplet microfluidic system to the one or more output devices.

The present invention is described in detail below with reference to the accompanying drawings.

DESCRIPTION OF THE DRAWINGS

The above and further advantages of the invention may be better understood by referring to the following description in conjunction with the accompanying drawings, in which:

FIGS. 5A-5C depict genetic operators implemented on MLNs (a) coding scheme, (b) mutation, (c) one point crossover in accordance with one embodiment of the present invention;

FIGS. 12A-12D depict coding and decoding microfluidic networks (a) nodal structure of microfluidic device, (b) incidence matrix with redundant information, (c, d) transformed structure and matrix in accordance with one embodiment of the present invention;

DESCRIPTION OF THE INVENTION

Figure 1:
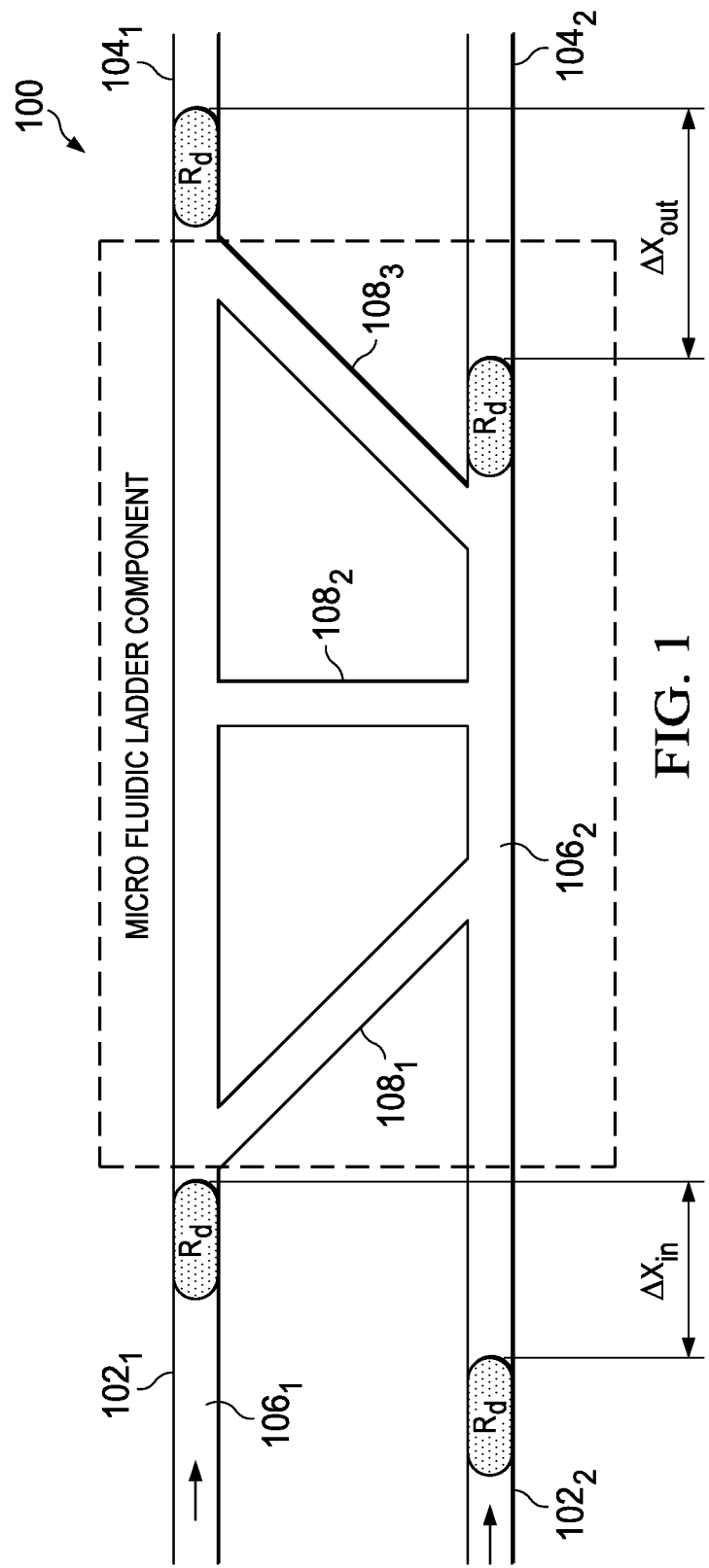
FIG. 1 depicts a ladder network with a combination of backward, vertical and forward bypasses in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to the design and simulation of ladder networks, but it will be understood that the concepts of the present invention are applicable to the design and simulation of any type of microfluidic device.

Advanced computational techniques have the potential to accelerate the design discovery process of microfluidic devices through a top down approach i.e., rigorous simulations to discover optimal designs for the given task, which would then lead to experimental validation. Reliable computational approaches can have a tremendous impact in this area similar to the impact of simulations in the electronics industry.

Two main challenges that need to be confronted in the realization of such a computational framework are: (i) computational science related to rapid simulation of very large networks; development of predictive models that will form the basis for characterizing droplet motion through interconnected and intricate large-scale networks, and (ii) conceptualization of a design approach that is generic in nature and not very narrowly defined limiting its application potential. Development of predictive models will have to address the inevitable complex nonlinear dynamics of droplet-based microfluidic systems [11,12,13]. For example, it has been shown that binary decisions that droplets make at bifurcations can lead to fascinating nonlinear dynamics, including chaos and fractal behavior. Nonetheless, rapid progress is being made in characterizing the dynamic behavior of various phenomena that occur in droplet-based microfluidic devices. On the other hand, there is very limited work that can be found in the open literature of rational design approaches for discovering large-scale microfluidic networks.

The present invention provides a rational design framework for complex microfluidic networks that incorporate several design elements: (i) modeling droplet microfluidic platforms using nodal analysis, and (ii) formulation of a custom genetic algorithm to design large scale droplet microfluidic systems. As a first step, a rational design approach for a novel substructure, the ladder networks, will be described.

A Genetic algorithm (GA) based optimization technique is formulated to optimally design the ladder networks for a given objective function. A multi-objective optimization problem is solved to obtain specified spacing of drops at the outlet with minimum number of bypasses. The proposed GA approach is implemented to design ladder networks that achieve: exit timing synchronization of a pair of drops coming with fixed input spacing, synchronization of drops with variable input spacing, and enhancing the inter droplet spacing to a constant value for a range of inlet drop spacing. It has been observed that the design proposed by GA for a fixed input spacing synchronization is similar to the design validated analytically and experimentally in the literature.

A Microfluidic Ladder network (MLN) device contains a pair of parallel channels interconnected with bypasses. Droplets are transported through the parallel channels, whereas the bypass channels are inaccessible to the droplets. FIG. 1 represents an example ladder network 100, having a first inlet $102_1$, a second inlet $102_2$, a first outlet $104_1$, a second outlet $104_2$, a first channel $106_1$ connecting the first inlet $102_1$ to the first outlet $104_1$, a second channel $106_2$ connecting the second inlet $102_2$ to the second outlet $104_2$, a first bypass channel $108_1$ connecting the first channel $106_1$ to the second channel $106_2$ that slopes backward and is defined as a backward slant, a second bypass channel $108_2$ connecting the first channel $106_1$ to the second channel $106_2$ that is vertical and is defined as a vertical slant, and a third bypass channel $108_3$ connecting the first channel $106_1$ to the second channel $106_2$ that slopes forward and is defined as a forward slant. The bypass channels 108 of the MLN are defined based on their structural orientation in reference to the direction of motion of the droplets.

The spacing transformation achieved by a ladder network is defined as its functionality. FIG. 1 shows a pair of droplets $R_d$ entering the ladder network 100 at the first inlet $102_1$ and second inlet $102_2$ with an inlet spacing of $\Delta X_{in}$. This spacing is transformed to $\Delta X_{out}$ as the pair of droplets exit the ladder network 100 at the first outlet $104_1$ and second outlet $104_2$. The change in droplet spacing $\Delta X_{out}$-$\Delta X_{in}$ is due to the change in relative velocity between the two droplets. The change in the relative velocity is a result of flow distribution across the bypass channels $108_1$, $108_2$ and $108_3$. Symmetric ladder networks, i.e., networks with equally spaced vertical bypass channels are shown to reduce the droplet spacing [7], whereas asymmetrical ladder networks are shown to expand, contract, flip or synchronize the droplets [14]. In general, symmetric ladder networks offer less flexibility in terms of functionality compared to asymmetrical ladder networks. Additionally, asymmetric ladder networks have more parameters to optimize (e.g., spacing) compared to the vertical ladder networks.

Any rational design framework requires a model of the underlying system for the optimization studies. The droplet dynamics in ladder networks is modeled by a network model [15]. Prior studies have shown that the predictions using this model agree reasonably well with the experiments [16,14]. The basic modeling equations that are used in this approach are given below:

Step 1: Resistance of the microfluidic channel is calculated based on its dimensions using the following equation [17]:

$$R = \frac{12 \mu L}{h^3 w}\left[1 - \sum_{r}^{\infty} \frac{1}{r^5} \frac{192}{\pi^5} \frac{h}{w}\tanh\left(\frac{r\pi w}{2h}\right)\right]^{-1} \quad (1)$$

where h, w, and L are the height, width and length of the channel, respectively. The bulk phase viscosity is $\mu$ and r is the series index which takes only odd values. The ladder network has a length of 10.1 mm and the transport channels are separated by 504 µm. The total resistance of the channel is calculated as $R_t=R+R_d$, based on the channel resistances (R) and droplet resistance $R_d=1.55$ kg/mm$^4$S. A node is defined as a point where more than two microfluidic channels intersect, due to mass balance at each node, $Q_{node}=\Sigma Q_i$, where $Q_{node}$ is the flow into or out of the node. Flow in a branch is $Q=R_t/\Delta P$.

Step 2: Velocity of the droplet ($V_d$) is based on the bulk flow rate in the channel; $V_d=\kappa Q_i$—where slip factor ($\kappa$) is 1.4.

Step 3: In the simulation, droplets move with the velocities calculated in step 2 until they encounter a node.

Step 4: As the droplet enters a node, the resistances and velocities are re-calculated using Step 1 and 2. The algorithm is repeated until both the drops exit the system.

A generic ladder network simulation approach based on the above modeling equations was developed. The model is used by GA to obtain optimal MLN designs by varying the design parameters such as number, spacing and orientation of the bypasses.

Genetic algorithms developed by Holland [18] and Goldberg [19] are shown to solve complex optimization problems that are constrained and have discontinuous objective function. These techniques are also used to solve combined structural and continuous variable problems efficiently [20, 21]. The final solution has several acceptable designs due to hyperplane sampling [22]. Genetic algorithm works on the principle of evolution. The designs variables are coded into binary strings; and using evolutionary principles the algorithm is iterated to achieve optimal ladder design based on the given objective function.

The GA based optimization technique was used for designing ladder networks for a given objective function. GA optimizes the structure of ladder networks by modifying their design parameters. A custom GA was developed to handle the constraints present in the ladder networks as a generic GA results in large set of infeasible solutions [23]. The constraints for designing ladder networks include: (i) the bypasses of the ladder network are not allowed to intersect and (ii) the minimum spacing between two adjacent nodes is greater than 100 µm which gives enough flexibility for fabrication. The design parameters are coded into binary strings as GA's use genetic operators to modify them. The optimality of the resulting ladder design is verified by comparing the results of network model simulation with the given objective function.

Figure 2:
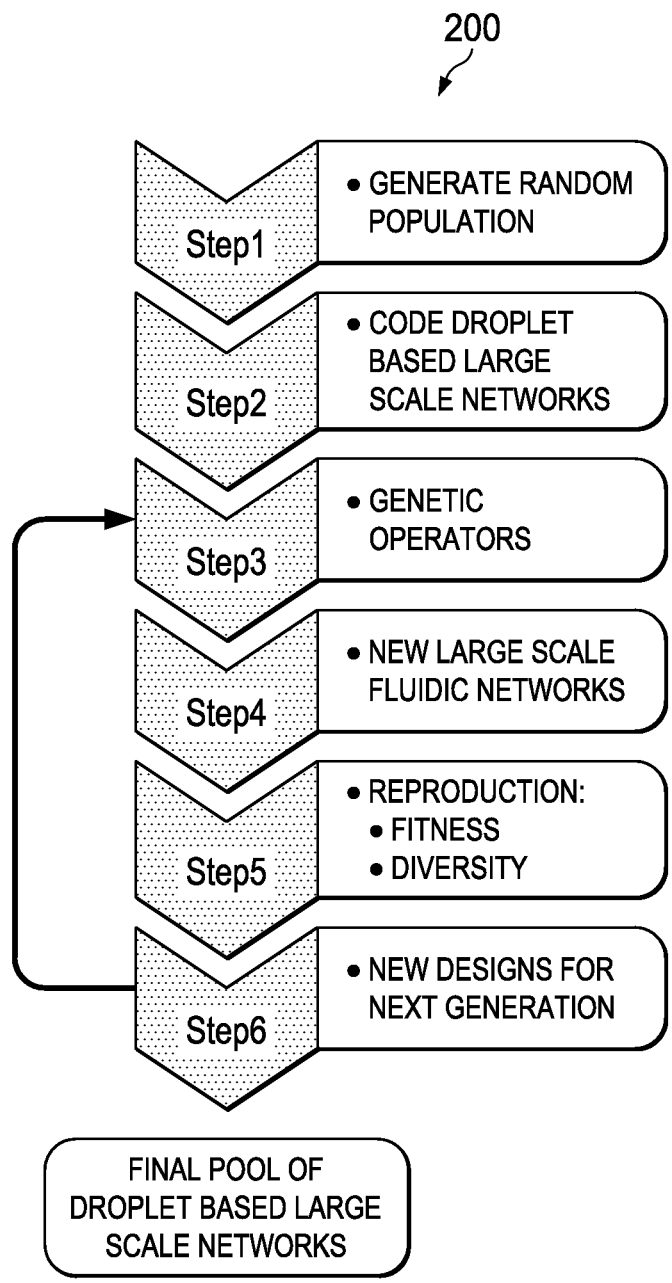
FIG. 2 depicts an implementation of Genetic Algorithm (GA) approach in accordance with one embodiment of the present invention.

Now referring to FIG. 2, an implementation of GA approach 200 in accordance with one embodiment of the present invention is shown:

Step 1: Generate a random population of droplet based large scale (fluidic) networks.

Step 2: Code the droplet based large scale (fluidic) networks.

Step 3: Perform genetic operators on the coded droplet based large scale (fluidic) networks.

Step 4: New coded droplet based large scale (fluidic) networks.

Step 5: Reproduction: Fitness and Diversity scores for the new coded droplet based large scale (fluidic) networks.

Step 6: New designs for next generation based on the fitness and diversity scores. Repeat Steps 3-6 if a specified number of next generations have not been created.

Provide the final pool of droplet based large scale network.

Figure 3:
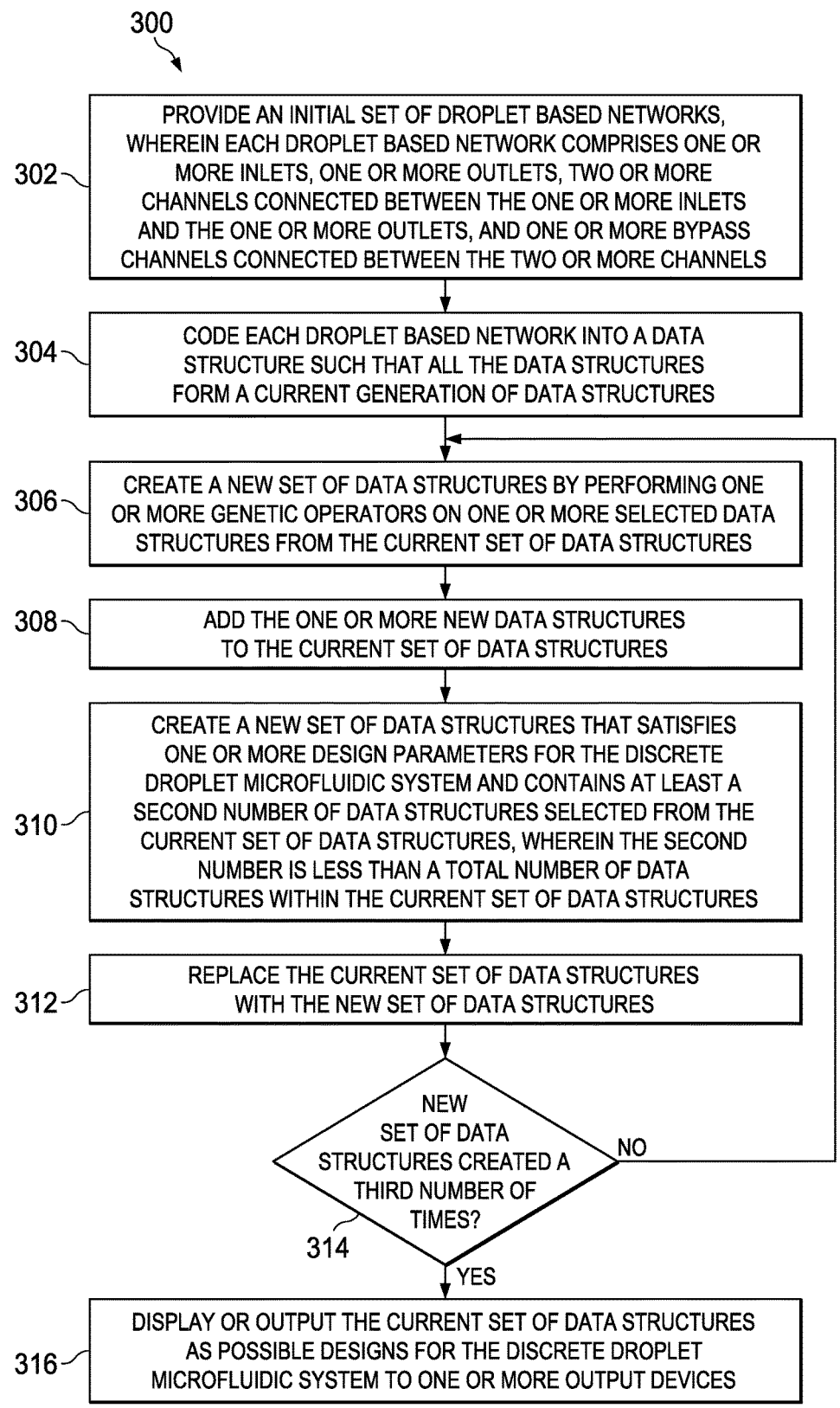
FIG. 3 depicts a flow chart of a method for designing a discrete droplet microfluidic system in accordance with one embodiment of the present invention.

Referring now to FIG. 3, a flow chart of a computerized method 300 for designing a discrete droplet microfluidic system in accordance with one embodiment of the present invention is shown. An initial set of droplet based networks containing a first number of droplet based networks is provided in block 302. Each droplet based network comprises one or more inlets, one or more outlets, two or more channels connected between the one or more inlets and the one or more outlets, and one or more bypass channels connected between the two or more channels. Each droplet based network is coded into a data structure such that all the data structures form a current set of data structures in block 304. One or more new data structures are created by performing one or more genetic operators on one or more selected data structures from the current set of data structures in block 306. The one or more new data structures are added to the current set of data structures in block 308. A new set of data structures are created in block 310 that satisfies one or more design parameters for the discrete droplet microfluidic system and contains at least a second number of data structures selected from the current set of data structures. The second number is less than a total number of data structures within the current set of data structures. The current set of data structures is replaced with the new set of data structures in block 312. If the new set of data structures have not been created a third number of times, as determined in decision block 314, the process loops back to block 306 and repeats the steps as previously described. If, however, the new set of data structures have been created a third number of times, as determined in decision block 314, the current set of data structures is displayed or outputted as possible designs for the discrete droplet microfluidic system to one or more output devices. Blocks 306-316 are executed by one or more processors communicably coupled to the one or more output devices. Note that the one or more output devices (e.g., displays, printers, data storage devices, etc.) can also be input/output devices. Moreover, the processors and output/input devices can be any device with a user interface as will be appreciated by those skilled in the art.

In addition, the present invention provides a non-transitory computer readable medium encoded with a computer program for designing a discrete droplet microfluidic system that when executed by one or more processors perform the steps described above in reference to blocks 306-316.

Moreover, the present invention provides an apparatus for designing a discrete droplet microfluidic system that includes one or more processors, a memory communicably coupled to the one or more processors, and one or more output devices communicably coupled to the one or more processors. The one or more processors perform the steps described above in reference to block 306-316.

Figure 4:
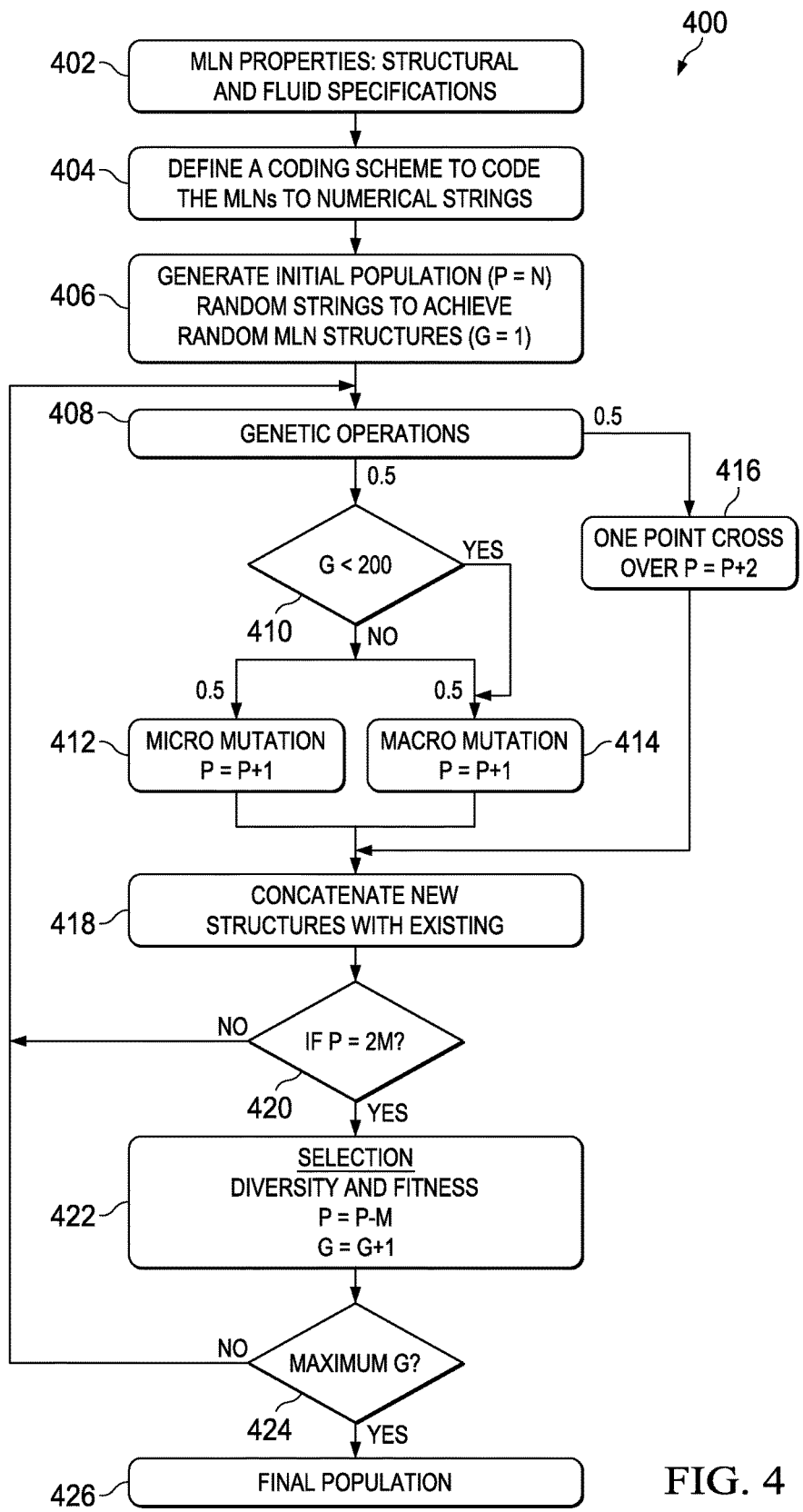
FIG. 4 depicts a flow chart of a GA implementation for designing microfluidic ladder networks in accordance with another embodiment of the present invention.

Now referring to FIG. 4, a flow chart of a GA implementation 400 for designing microfluidic ladder networks in accordance with another embodiment of the present invention is shown. MLN design parameters, such as structural properties (e.g., dimensions) and fluid properties, are specified in block 402. A coding technique is used to transform the design parameters into numerical (e.g., binary) strings in step 404. GA requires an initial population of MLN structures as a seed value, so an initial population of M networks is randomly generated as the first generation (G=1) in step 406. Note that the initial population can be entered manually or from a predetermined data set instead of being generated randomly. As will be described in more detail below, as the algorithm progresses, these random structures are modified using genetic operators, such as mutation, one point crossover, and selection. The implementation of genetic operators leads to increase in the overall population. As the overall population doubles its initial size i.e., 2M, the selection operator, based on a fitness function, is used to reduce the overall population size back to M—this whole process is defined as one generation. The fitness function is calculated by giving the design parameters to the network model. The algorithm is iterated until the current generation reaches a maximum value. The final population consists of several ladder designs that satisfy the proposed objective function.

The genetic operations on the current generation of structures (data models) begin in block 408. The structure in the current generation are selected and then modified by mutation at a first probability (e.g., 50% of the time) (blocks 410-414) and one point crossover at a second probability (e.g., 100%—the first probability or 50% of the time) (block 416). So in this example, approximately 50% of the structures in the current generation will be modified by mutation and approximately 50% of the structures in the current generation will be modified by one point crossover. The 50/50 distribution in the example shown in FIG. 2 can be changed as desired. Moreover, it is possible, although not preferable, to have another probability in which a mutation or one point crossover is not performed a structure within the current generation. For example, approximately 45% of the structures in the current generation could be modified by mutation, approximately 45% of the structures in the current generation could be modified by one point crossover, and 10% of the structures in the current generation could not be modified at all. The new structures are concatenated with the existing structures in block 408. If the number of existing data structures (population P) is less than a specified number of data structures (e.g., 2M), as determined in decision block 420, the process loops back to block 408 to generate new data structures as previously described. If, however, the number of existing data structures (population P) is equal to a specified number of data structures (e.g., 2M), as determined in decision block 420, a selection process is performed on the existing data structures to reduce the number of data structures to a specified number of data structures (e.g., Ai) in block 422. The selection process uses diversity and fitness scores to select the best data structures for the next generation as will be described in more detail below. If a specified number of generations have not been created, as determined in decision block 424, the process loops back to block 408 to generate new data structures as previously described. If, however, a specified number of generations have been created, as determined in decision block 424, the final population is provided in block 426.

The detailed process of coding a generic ladder network into a data structure will now be described. In general GA's operate on binary strings, hence the design parameters of the MLN are coded into binary and real values. The basic requirement of coding scheme is to develop a format that has a one-one mapping between the coded scheme and the original structure. Additionally, the coded data structure should include the capability of spanning all the possible designs of ladder networks by manipulating the real and binary values. The coding scheme is developed by visualizing the ladder networks in nodal form-node is a point where more than two branches intersect. The proposed coding scheme transforms a ladder network into a data structure having four groups. This coding scheme of GA gives flexibility to modify the design parameters of the ladder networks and search the entire design space. The individual attributes of the coded data structure are shown below:

Total bypasses (TB): This group contains a binary representation of the total number of bypasses that are present in the ladder network. If the length of the binary string is p, then the maximum number of bypasses (N) are equal to $2^p-1$.

Real value (V): Information of the normalized nodal positions is coded in this group. Each pair of data represents the top and the bottom positions of the bypasses. The size of this group is fixed to 2N, where N is the maximum number of bypasses considered in the algorithm. Although the total number of bypasses in the ladder network can vary from 1 to N, the length of the array is kept constant at 2N for computational flexibility. Notice that this is the only group containing real values.

Choice of Top segment (SC): This group contains binary values which give information about the presence of a bypass at the position specified by the value group. A value of 1 in $SC_t$ implies that a bypass is present at that node and if it is 0 bypasses are absent.

Choice of bottom segment ($SC_b$): This group also contains binary values which define the position of the bypasses on the lower segment. The total number of ones in the "choice of top segment" matches the summation of ones in this group.

An example of coding scheme for a three bypass ladder network is given in FIG. 5A. The objective is to convert the given network into a data structure. The TB group, as explained above, gives the binary representation of the total bypasses present in the ladder network. In this case, the value of '0 1' means that the ladder network has only one bypass. The 'V' group contains the normalized nodal positions based on the maximum number of bypasses. The values group gives a possible choice for positioning bypasses, these values can be left empty or have a bypass associated with them based on the segment choice groups. The segment choice groups, $SC_t$ and $SC_b$ contain '1 0 0' and '0 0 1', respectively. This implies that a single bypass is present between the first node of the top branch and the last node of the bottom branch. This coding scheme facilitates best flexibility in spanning the entire design space without bypasses being crossed.

Several coded structures are generated randomly for the first generation of the GA. A total of 2N real random numbers between 0 and 1 are generated for the value group. These values represent the possible nodal positions of the bypasses normalized with the total length of the ladder network. The values are generated in such a way that the minimum distance between adjacent nodes is ensured to be greater than 100 μm. The maximum number of bypasses a ladder network can have is limited to N number of bypasses. Random binary values are generated for TB group with minimum value of 1, such that at least one bypass is present in every ladder network. Therefore the minimum number of bypasses is 1 and the maximum number of bypasses is N. Similarly, random binary numbers are generated for $SC_t$ and $SC_b$ groups. It ensured that the number of ones in the $SC_t$ group matches with the $SC_b$'s group; and the summation of all the ones in $SC_t$ or $SC_b$ group is equal to the decimal value of TB group.

Genetic operators are one of the key components of GA. They help in improvising the designs over generations. Given an initial population of ladder networks, new networks are generated by performing genetic operations. The three types of genetic operations implemented in the proposed algorithm are: (i) mutation, (ii) one point crossover and (iii) selection. These operators are explained in detail below.

The mutation operator modifies the structure of the ladder network by changing the number and orientation of the bypasses. Mutation either increases or decreases the number of bypasses. In the current algorithm, mutation is performed in two stages. In stage 1, mutation is implemented on 'TB' string and in stage 2, it is also implemented on the $SC_t$ and $SC_u$. Since, changing the values in 'TB' group will result in a drastic change in the number of bypasses, the tier 1 mutation modifies 'TB' group and thereby resulting in a drastic variation in the number of bypasses. Tier 1 mutation is implemented for first 200 generations, after that to achieve a more nuanced variation in ladder structures, tier 2 mutation is implemented in-addition to tier 1. This nuanced mutation is performed on the choice of the segment groups by removing or adding only one bypass to the ladder network in contrast to tier 1 mutation. Thus, mutation brings diversity to the whole population by modifying the number and orientation of the bypasses.

FIGS. 5A-5C show an example of implementing both tier 1 and tier 2 mutations on the ladder networks. In case of tier 1 mutation, the binary string is mutated from '0 1' to '1 1', this results in adding two new bypass to the MLN. The new bypasses are obtained by randomly selecting the top and bottom positions. Thus, achieving the design shown in FIG. 5B (left). In case of tier 2 mutation, the ladder designs are modified by changing just one bypass. This is achieved by selecting a random location of $SC_t$ string and its value is toggled from 0 to 1 or vice-versa. Similar manipulation of binary digits is performed on $SC_b$, which ensures that both of the groups, $SC_t$ and $SC_b$, have the same number of zeros and ones. Hence, tier 2 mutation adds or removes one bypass, achieving a nuanced operation as shown in FIG. 5B (right).

The initial 200 generations are mutated using tier 1 technique. After 200 generations, tier 2 mutation is applied with a probability of 0.5. Notice that the implementation of the mutation operator will increase the population by one unit at every iteration.

One-point crossover operation combines two ladder networks to create a new pair of ladder networks as shown in FIG. 5C. In contrast to the mutation operator, this operator modifies all the groups in the coded data structure. Two parent ladder networks are picked randomly from the population and two daughter networks are generated. Consider two parent ladder networks with the TB groups as $TB_1$ and $TB_2$ then the daughter ladder networks TB groups, TB' and TB" are calculated as follows:

$$TB'=[TB_1(1:\zeta-1)TB_2(\zeta:p)]$$

$$TB''=[TB_2(1:\zeta-1)TB_1(\zeta:p)] \quad (2)$$

In the above equation, $\zeta$ is a random integer generated from 1 to length of the TB group (p). For a $\zeta$ value of 2 an example of obtaining TB groups is shown in FIG. 5C. The 'TB' group of the parent structures are '1 1' and '1 0', which are interchanged to '1 0' and '1 1'. The daughter networks real values V', V" are generated by weighted mean average of the parent networks real values $V_1$, $V_2$, and are given as follows:

$$V'=\gamma V_1+(1-\gamma)V_2$$

$$V''=(1-\gamma)V_1+\gamma V_2 \quad (3)$$

In the above equation, γ is a random number between 0 and 1. The choice of segment groups are randomly assigned to match the total number of bypasses as given in the 'TB' group. The resulting networks after one-point cross over are shown in FIG. 5C. The new off-springs generated are verified for the minimum clearance constraint. If the constraint is violated, a new γ is generated to obtain different daughter networks. The ladder networks generated through one-point cross over will have the properties of both their parents. This facilitates in searching locally the design space to find better structures. Notice that the one-point cross operation increases the overall population by two units at each iteration.

The objective of selection is to terminate the non-elitist structures and populate the elite structures for the next generation. Selection operation is performed only after implementing several mutations and one point crossovers which results in the overall population increasing to 2M. The objective of selecting elitist is achieved by using two metrics such as: fitness (F) and diversity (D). Fitness quantifies the structure with respect to the given objective function, whereas diversity quantifies the similarity between a particular network with the rest of the population:

Fitness (F): The use of the fitness metric is to quantify the ladder networks based on the given objective function. The ladder network with the highest fitness value has best satisfied the proposed objective function. Networks with highest fitness function are chosen from the population for the next generation. This helps in developing off-springs which have the desired properties. The fitness function for achieving a particular droplet spacing (d) at the exit with minimum number of bypasses is given as follows:

$$F_1 = \left( \sum_{x_l}^{x_u} |\Delta X_{out,i} - d| + \alpha \frac{n-1}{N} \right) \quad (4)$$

$$F = e^{-\beta F_1}$$

In Equation 4, β and α are normalizing factors and n, N are the total number of bypasses and the maximum number of bypasses, respectively. Equation 4 represents a fitness function with multiple objectives. The first term in the exponent ($\Sigma_{x_l}^{x_u}|\Delta X_{out,i}-d|$) is a summation of error in outlet spacing, for a range of input spacings, with a fixed delay d. The second term $$\left( \frac{n-1}{N} \right)$$

gives a normalized value of the total bypasses. Therefore a higher fitness value has minimum bypasses and achieves a fixed delay (d). Since the spacing is in microns, β is used as normalization factor and α is determined by trial and error, so that both the terms have similar magnitude. Therefore, reducing the first term gives a ladder network that transforms the exit drop spacing to a particular delay 'd' for a range of input spacings, whereas the second term in the expression reduces the number of bypasses. Using the above formulation, the fitness of a ladder network is calculated.

Diversity (D): The objective of diversity is to maintain diverse population at every generation. This helps the GA in two fold; first, the final population has several solutions for a given objective function and second, it constrains GA from converging to a local minima. The metric to estimate the diversity between two coded ladder networks is defined as follows:

$$T_i(j) = \|SC_t(i) - SC_t(j)\|_\infty + \|SC_b(i) - SC_b(j)\|_\infty + \|V(i) - V(j)\|_\infty \forall j=1:2M \text{ and } j\neq i$$

$$D(i) = \text{Min}(T_i) \forall i=1:n \quad (5)$$

In the above equation, $T_i(j)$ gives the maximum variation present in between $i^{th}$ and $j^{th}$ networks. The variation is measured by the difference in the choice of segment groups, $SC_t$ and $SC_b$, along with the difference in actual position of the nodes, V. Vector $T_i$ contains the maximum difference between the choice of segments and nodal positions of $i^{th}$ structure with respect to all other structures. The diversity metric, D(i), is defined as the minimum value of $T_i$. Therefore, a zero value of D(i) implies that there exists another exactly same network in the population.

The next generation population is obtained by choosing networks from three groups, the first 10% are from the elitist of the previous population based on fitness, i.e., the networks having maximum fitness value irrespective of diversity, the later 80% are chosen based on diversity and fitness, D>0.03 and the last 10% are randomly assigned. If the population is less than 80% diverse, the number of random structures included in the next generation is increased to maintain the overall population of M for the next generation.

The proposed algorithm is implemented in three case studies. In the first case, the fitness function of GA is formulated to obtain a ladder network that synchronizes a pair of widely spaced drops with minimum number of bypasses. It is shown that the backward slanted bypass is the optimal structure for achieving synchronization of widely spaced drops [14].

In the second case study, the objective is to design a ladder network that synchronizes drops with a range of input spacings (μ±σ), where (μ) is the mean of droplet spacing with a variance of σ. In final case study, the objective of GA is to find ladder networks which transforms droplets coming at range of input spacing (μ±σ) to a constant spacing (d=2μ) at the exit.

The fitness function in the GA is formulated to design a ladder networks that achieve synchronization for pairs of droplets entering at a fixed delay of 1400 μm. The fitness function to achieve droplet synchronization with minimum number of bypasses is formulated as follows:

$$F_1 = |\Delta X_{out}| + \alpha(n-1)/N$$

$$F = e^{-\beta F_1} \quad (6)$$

The first term in the exponent ($\Delta X_{out}$) gives the error in synchronization, whereas the second term (n−1)/N in the expression reduces the number of bypasses. β and α are the normalizing factors. As the spacing is in microns β is used as normalization factor and is assumed as $10^4$. The objective is to synchronize a pair of droplets with fixed inlet spacing.

Figure 6A:
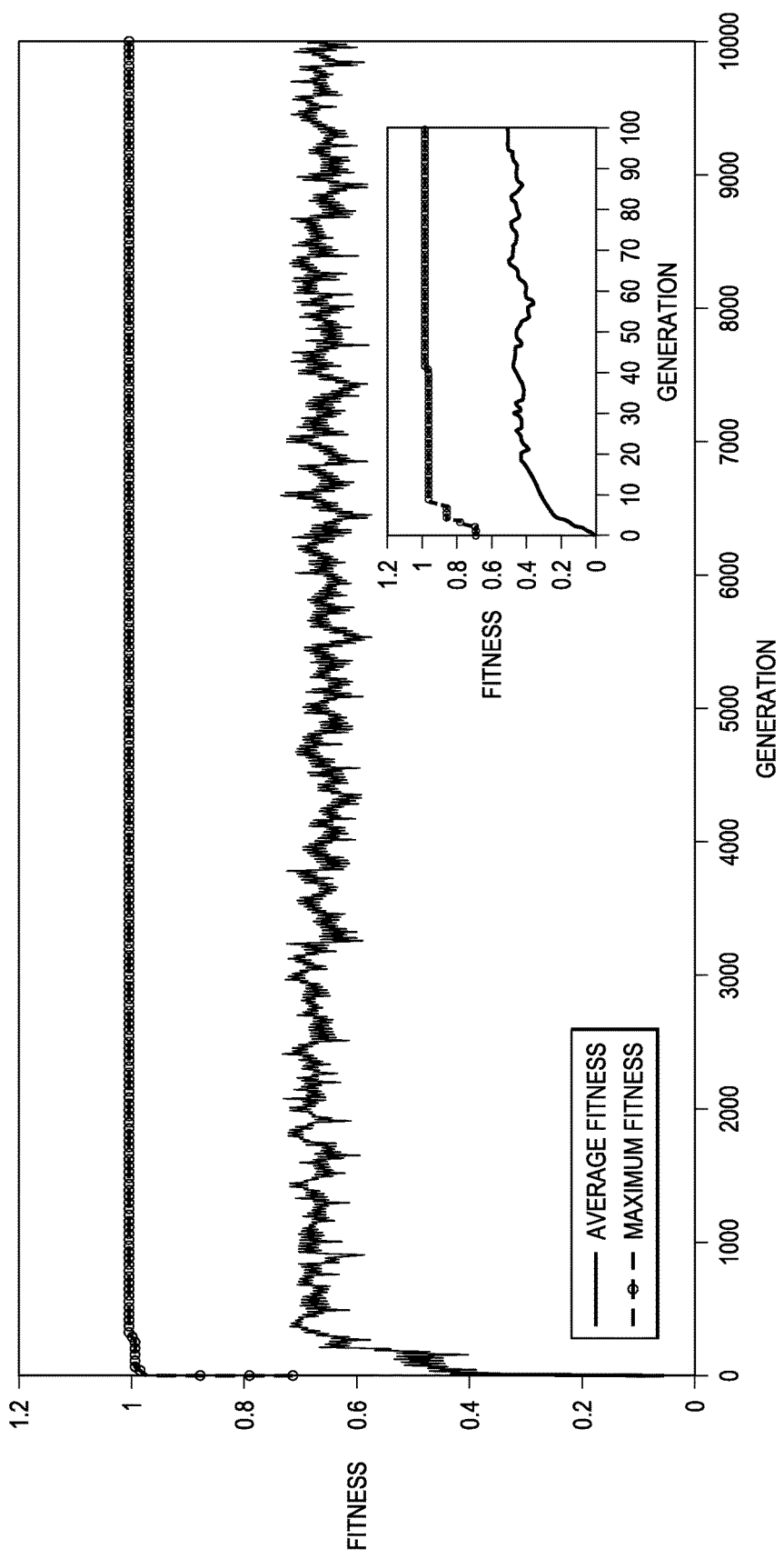
FIGS. 6A-6C show GA results for achieving synchronization for a fixed droplet spacing (a) average and maximum fitness as a function of generation, inset contains a zoomed plot for first 100 generations, (b) synchronization metric and diversity metric for MLNs in the final population arranged in ascending order of fitness value, (c) few solutions form the final population produced by genetic algorithm, the fitness rank is shown on the structure in accordance with one embodiment of the present invention.

FIG. 6A shows the evolution of the fitness in ladder networks as function of generation. Starting with an initial population of 100 random structures, the algorithm iteratively updates the population until 10K generations. FIG. 6A shows the maximum and the average fitness of ladder designs as a function of generation. It is observed that the maximum fitness and the average fitness reaches a constant value after $350^{th}$ generation. GA was terminated after 10K generations. The first major change in the evolution of ladder networks occurred at the $10^{th}$ generation as shown in inset of FIG. 6A. After the $100^{th}$ generation, the fitness remained constant at 0.992. The effect of local mutation started after the 200th generation is observed at 280th as the fitness has changed to 0.999. It is observed that there aren't any substantial changes in the elite structure of the population after 300th generation.

In the previous paragraph, the evolution of ladder networks based on fitness function was discussed. The effect of structural changes that led to the above sequence evolution is discussed in this paragraph. In first generation, the structure with 5 bypasses containing a combination of forward and backward slants has the highest fitness. At 3rd generation, a single bypass structure with slight backward slanted alignment is made the elite structure. A ladder network with two bypasses became the elitist in the 4th generation.

This two bypass structure remained elite till 7th generation. At 8th generation this structure is replaced by another backward slanted bypass. After 8th generation till the last generation, the single backward slanted bypass ladder network remained elite with minor modifications in the alignment of the bypass due to local mutation. Finally, the optimal structure with the best alignment for this objective has emerged on 9367th generation. Although the single backward slanted bypass was found in 8th generation, the rest of the generations helped in obtaining several other structures along with enhancing the backward slant to the optimal slope.

Figure 6B:
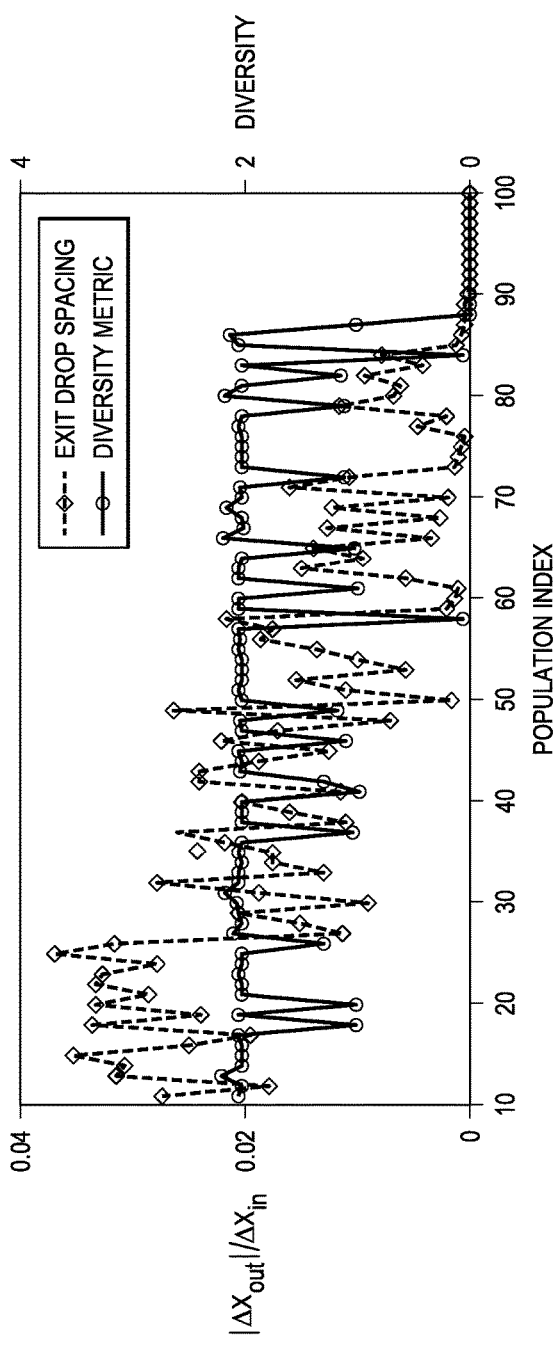

The final ladder structures at generation 10K arranged in ascending order of their fitness value (F) are shown in FIG. 6B. This figure has two y-axis, on the right side of the plot the diversity metric is plotted and on the left side of the plot a synchronization metric is plotted. The index in the figure starts with 10 because the first 10 structures are random and they have very less fitness value. In the plot, the ladder structure with index 10 has lowest F value whereas structure with index 100 has the highest F value. FIG. 6B on the left y-axis contains the synchronization metric ($\delta = |\Delta X_{out}|/\Delta X_{in}$), whereas the right axis contains the diversity metric (D). A value of synchronization metric ($\delta$) close to zero implies the structure has good capability of synchronization and a non zero value of D implies that the structure is unique in the population. The last 10 structures in the plot have the D value same because they are all chosen based on fitness without considering diversity, hence most of them are similar. Notice that even though the overall fitness value of structure with index 76 is less compared to the other higher indexes, it has a less $\delta$ value compared to the structures with indexes of 77 to 80. As the fitness function has multiple objectives, the elitist structure need not have the minimum $\delta$ value. The 76 structure achieves better synchronization with 3 bypasses whereas the higher index structures achieve synchronization with less bypasses. This shows the ability of GA to uncover possible diverse combinations of ladder networks that achieve synchronization for a constant delay.

Figure 6C:
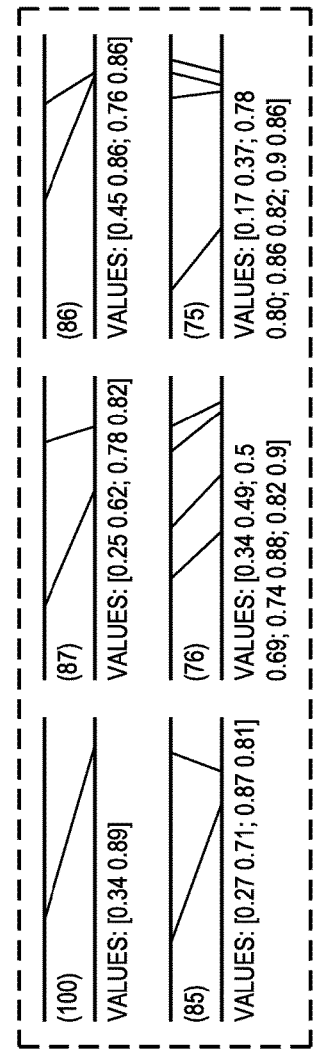

FIG. 6C shows diverse ladder networks that achieve timing synchronization of droplets that have a fixed delay at the inlet. The structure index is shown on the ladder network along with the normalized nodal positions. The 100th structure is the elitist as it can achieve synchronization with only one bypass. Maddala J, Wang W, Vanapalli S, Rengaswamy R., "Traffic of pairs of drops in microfluidic ladder networks with fore-aft structural asymmetry", Microfluidics and Nanofluidics (2012) (1-810.1007/s10404-012-1054-z) [14] has shown that a single backward slant is the optimum structure to synchronize drops. Therefore the proposed GA achieved global optimum solution for this objective function. The 85th structure achieves the synchronization with two bypasses. Even though both these structures have a backward slanted bypass, the change in the slope of the backward slanted bypass is compensated by the addition of another bypass in the structure with index 85. Highest index has highest magnitude of synchronization with minimum number of bypasses. The 87th structure synchronizes better than ladders 85 and 86.

The output drop spacing for 100th structure with an inlet drop spacing of 1400 µm is 0.0 µm and for the structures 85, 86, 87 the outlet spacing of drops are 1.5, 0.9, 0.5 µm, respectively. Previous studies have shown that ladder network with 10 vertical bypasses reduce droplet spacing from 160 µm to 0.1 µm as they exit the network [7,16]. In this work, because of using multi objective optimization GA revealed several structures that achieve better synchronization compared to laborious experimental trial-and-error procedures.

Another interesting outcome of generating multiple solutions is that a detailed understanding on the effect of number and orientation of bypasses to the functionality of the ladder network is obtained. In case of structure with index 100, ladder network with a single bypass achieved synchronization of the drops. So, in case of single bypass ladder network, a backward slanted structure is optimum for synchronization. An important question to address here is— What is an optimum structure for synchronization with two bypasses? Observing the structures with 85, 86, 87 answers this question. Structure with index 85 and 86 have backward slanted bypasses followed by a forward and a backward slanted bypass, respectively. In case of structure with index 87, the backward slanted bypass is followed by a vertical bypass. Since highest index has highest fitness therefore, it is observed that in case of ladder networks with two bypasses, the optimum structure is a backward slanted network followed by a vertical bypass.

In the second case study, the fitness function is modified to design ladder networks that achieves synchronization for a range of input spacing. The objective is modified for designing ladder networks that should synchronize a pair of drops coming at an input spacing of 1050±350 µm with minimum number of bypasses. The fitness function to achieve the proposed design is given below:

$$F_1 = (\Sigma_{x_j}^{x_u} |\Delta X_{out,i}| + \alpha(n-1)/N)$$

$$F = e^{-\beta F_1} \qquad (7)$$

Figure 7A:
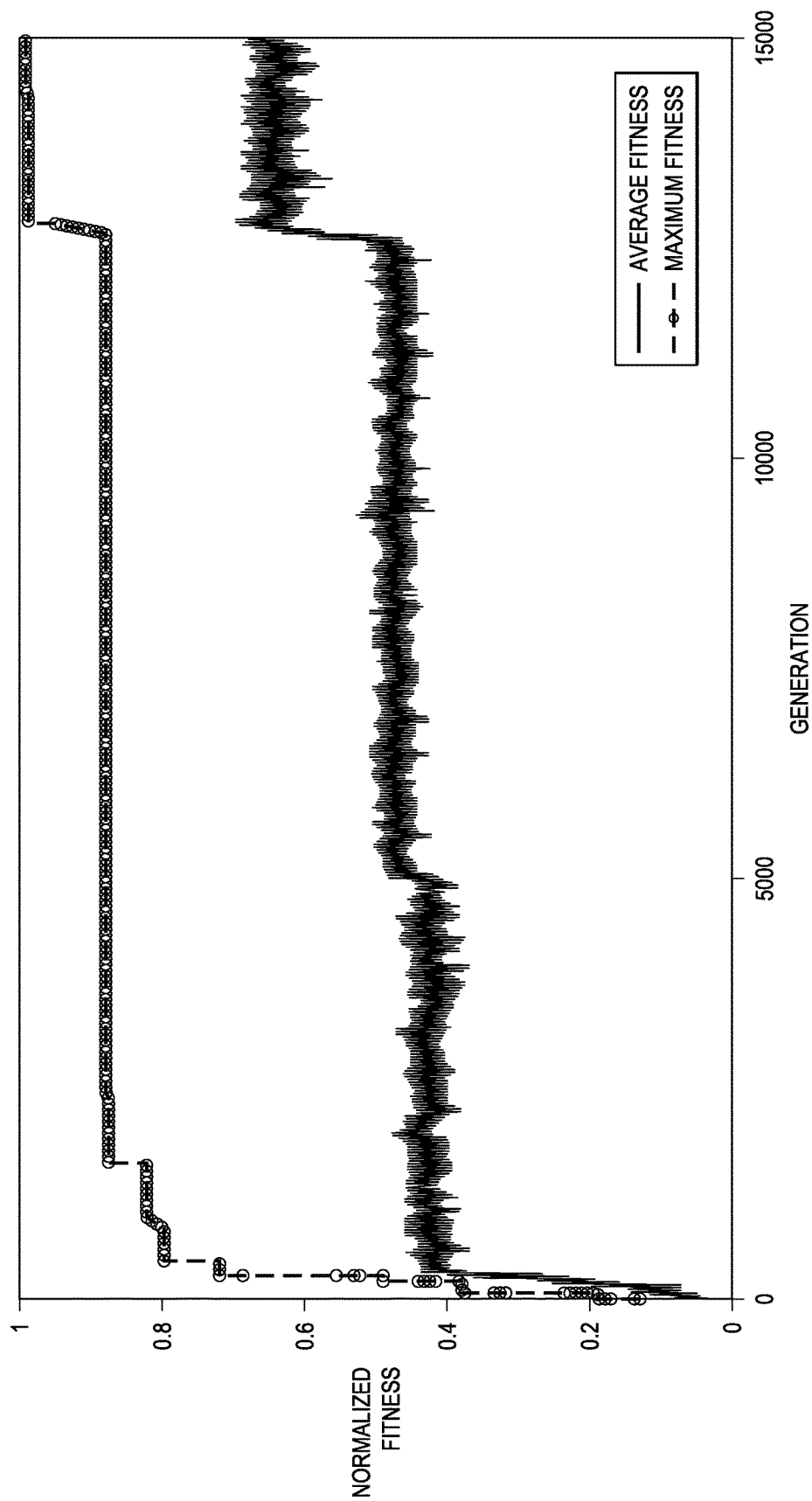
FIGS. 7A-7D show GA results for designing ladder network that achieve synchronization for a range of input delay, (a) normalized average and maximum fitness as function of generation, (b) synchronization metric and diversity metric for final population arranged in ascending order of fitness, (c) two structures from the final population that have best fitness and best synchronization metric, (d) transformation of inlet spacing as a pair of droplet move in the ladder network in accordance with one embodiment of the present invention.

The algorithm is simulated for 15K generations and the maximum fitness function has a constant value from 600 to 2K generations and increases substantially at 2K and 12K generations. In contrast to the previous case, this objective function required several generations to increase the fitness of the population. This is due to the complexity of objective function. Achieving a constant outlet spacing for a range of input spacing using a MLN is challenging because the ladder networks have one-to-one mapping [14] between input delay and output delay. Since in this case the objective is to synchronize for a range of input delays, the algorithm takes more generations to significantly increase its fitness. The fitness value shown in FIG. 7A is normalized to the maximum fitness as the fitness function never reaches 1 even after 15K generations.

Figure 7B:
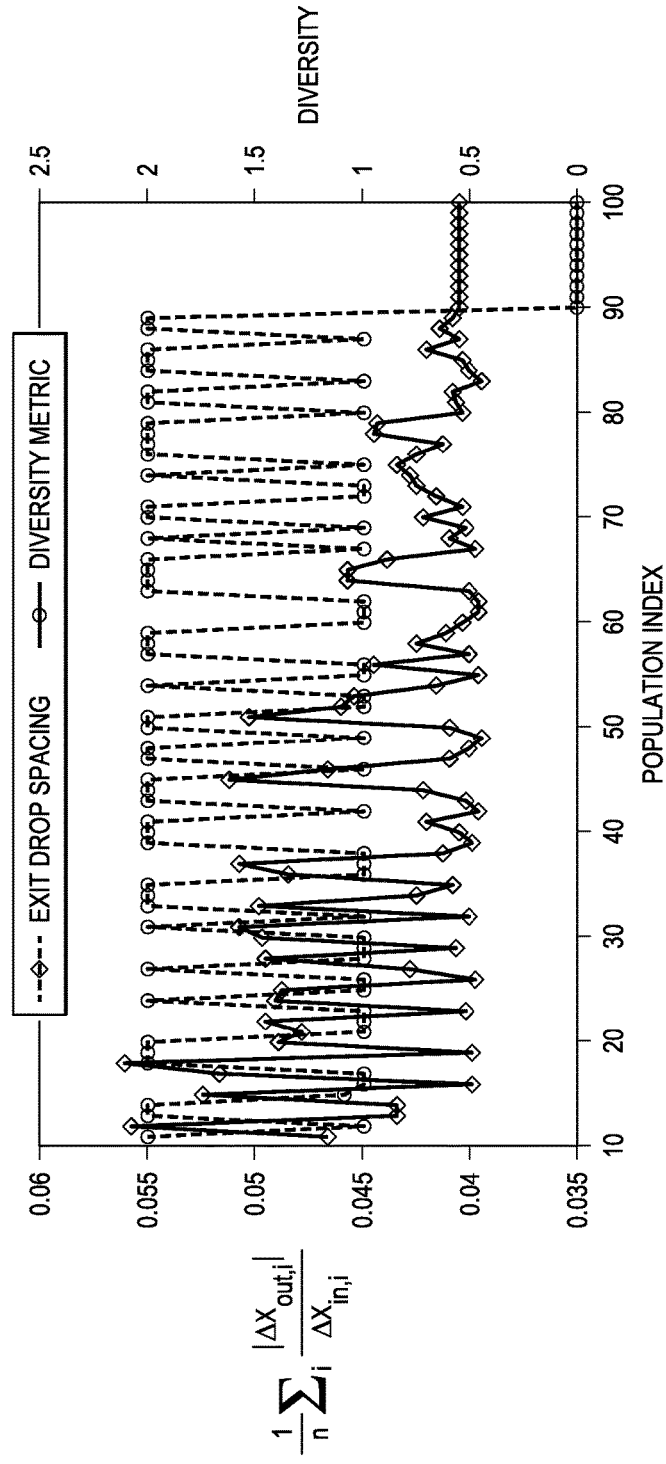

Similar to previous case, FIG. 7B shows the synchronization metric and diversity metric of the MLNs in the final population that are arranged in ascending order of their overall fitness. The plot has double y-axis, the left axis shows the synchronization metric $\delta =$ $$1/T \left| \sum_i^T \frac{\Delta X_{out,i}}{\Delta X_{in,i}} \right|,$$

and the right axis shows the diversity metric. Ideally, δ should be zero but because the ladder devices transform the input spacing bijectively [14], the δ value is always non-zero. Similar to previous case, the first 10 networks are randomly designed at every generation, whereas the last 10 networks are elitist that are generated over several populations. The structure at 83 has a δ value less than the elitist because it could achieve better synchronization for increase in bypasses.

Figure 7C:
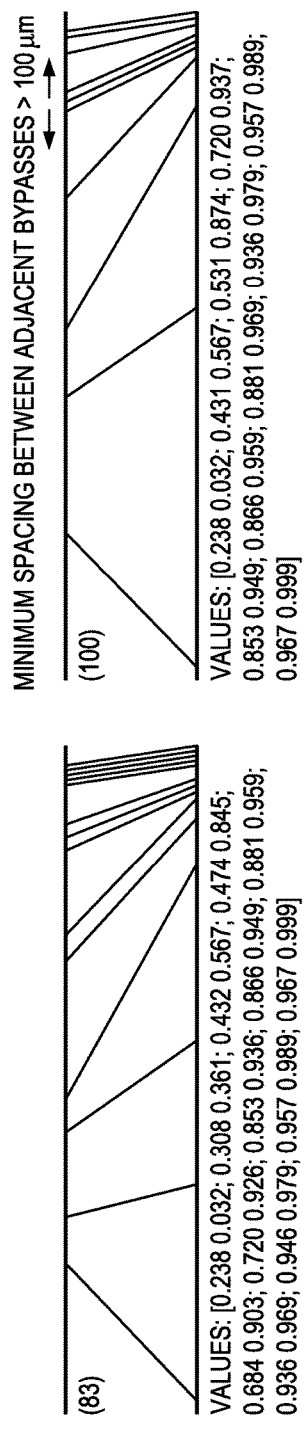

FIG. 7C shows two structures from the pool of the final population after 15K iterations. The $100^{th}$ index structure has 10 bypasses with a combination of forward and backward slanted bypasses. The exit spacing of drops is −77 μm and 79 μm for an inlet spacing 700 μm and 1400 μm, respectively. The negative value of the exit spacing implies that the lagging droplet at the entrance has overtaken the leading droplet. This ladder structure reduces the variation of inlet drop spacing of 700 μm to 156 μm at the exit. This shows that cleverly designed ladder network with only 10 bypasses could synchronize droplets entering at a variable inlet spacing.

The network not only synchronizes drops but also reduces the inlet droplet spacing variance by 78%. Previous studies [7,16] show that MLNs with 10 vertical bypasses achieve synchronization of drops coming at 190±60 μm. The exit spacing of these droplets is reduced by 93±5%. In the present ladder design, the droplets entering an initial spacing of 1050±350 μm is reduced to 96±2%. Further, if these bypasses are made vertical, the exit spacing is reduced to only 52±20%. This shows the importance of the orientation of bypasses to achieve synchronization for a range of input spacing.

In case of the structure with index 83, the exit spacing of droplets is −71 μm and 8 μm for an inlet spacing of 700 μm and 1400 μm, respectively. It is observed that due to increase in three bypasses from the $100^{th}$ index structure, the variance has reduced by 3%, i.e., form 156 μm to 152 μm. Further, due to implementation of the GA, there are 80 different structures that could achieve the task of synchronizing drops coming at range of input spacing.

Figure 7D:
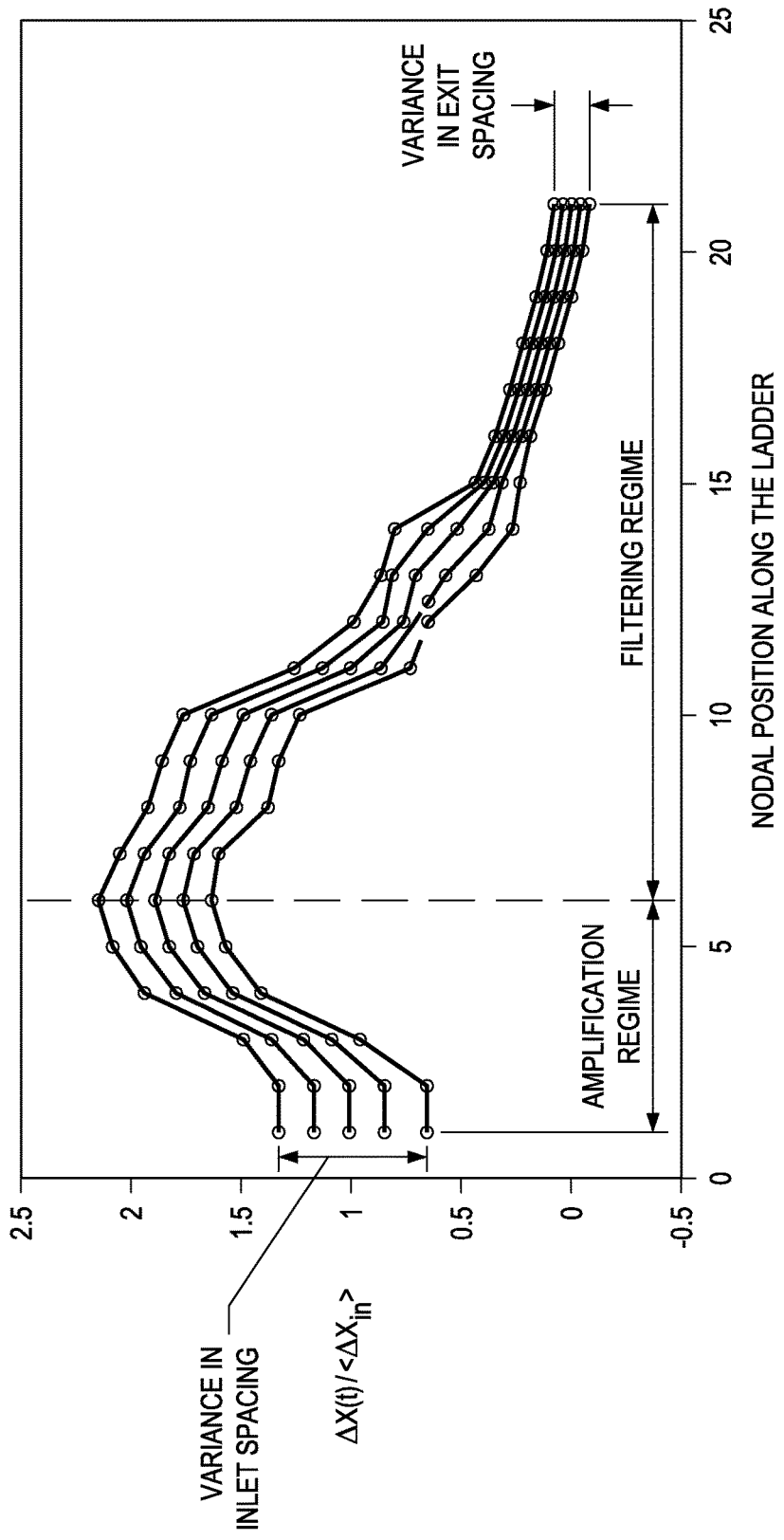

Interestingly, the droplet spacing is not reduced by all the bypasses even though the objective is to synchronize drops. The first 4 bypasses of the ladder network expand the droplet spacing while the remaining bypasses reduce the spacing to zero as shown in FIG. 7D. FIG. 7D shows the relative distance between the drops as the droplets travel through the nodes of the ladder network. As flows are calculated by the network model only when the droplets are at the nodes, the position of the drops are captured at those instances. There are 21 nodal positions plotted on the x-axis, because of 10 bypasses and one entrance value. It is observed that in contrast to synchronizer designs studied in literature [7,16] this phenomena of achieving synchronization with asymmetric bypasses is quite different. The reason is that the asymmetric bypasses change flows at different location on the transport channels compared to vertical bypass ladder networks. The objective of GA's is not only to reduce the mean but also variance, therefore to reduce the variance in the inlet, the first few bypasses in the ladder network acts as an amplifier and the later bypasses act as filter as shown in FIG. 7D. Thus, first few bypasses amplify the signal to a particular value where the signal can be completely filtered out by the rest of the bypasses. This is an outcome of complex flow variations that occurs in these bypasses, as they vary due to droplet motion in the ladder networks.

In the third case, GA is used to design ladder networks which produce a fixed droplet spacing at the outlet for a range of input spacings. The optimal ladder networks should expand pairs of drops coming in the inlet to a fixed spacing at the outlet. The fitness function to achieve this objective is given below:

$$F_1 = (\Sigma_{x_j}^{x_u} |\Delta X_{out,i} - d| + \alpha(n-1)/N)$$

$$F = e^{-\beta F_1} \qquad (8)$$

Figure 8A:
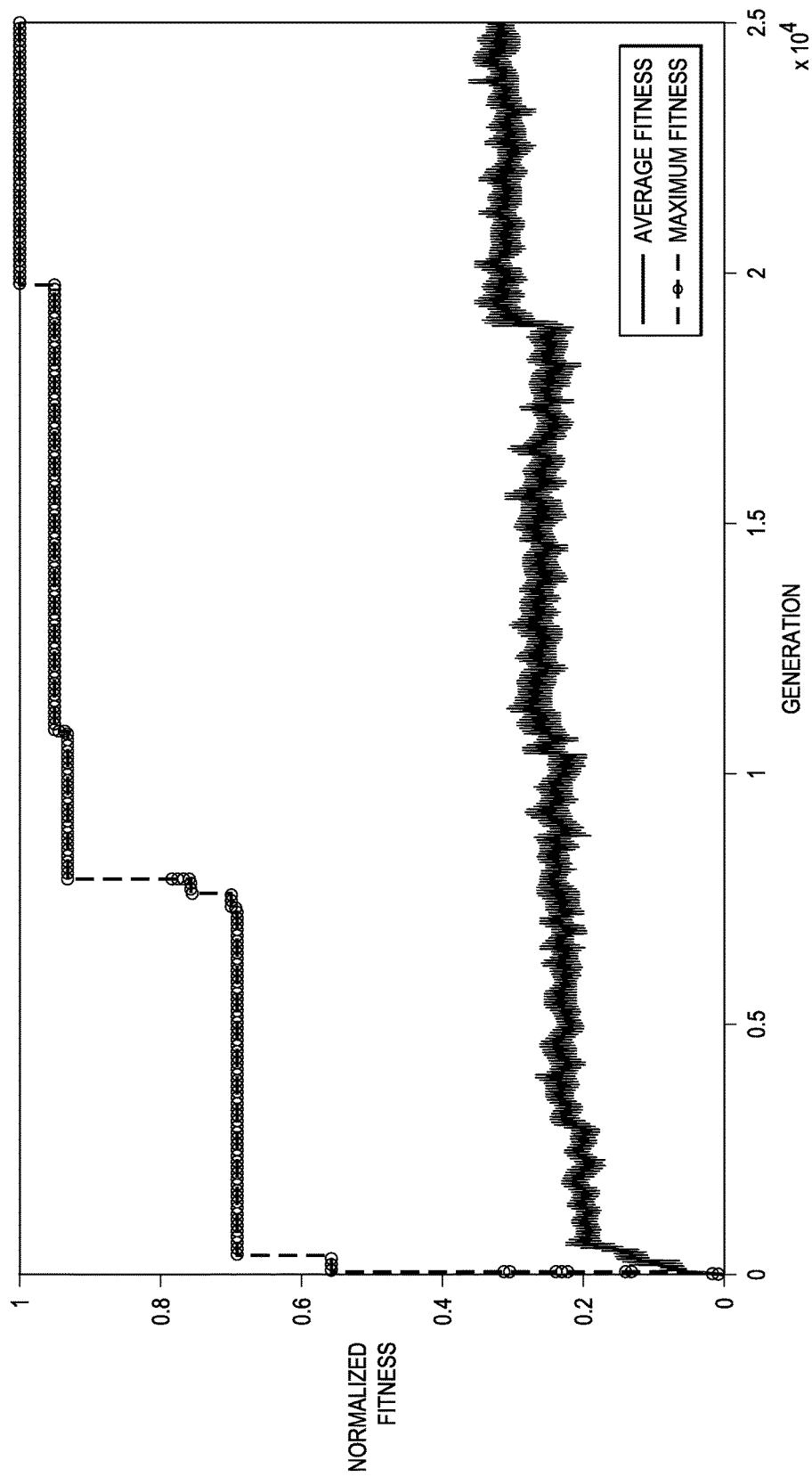
FIGS. 8A-8D show GA results for achieving a fixed delay at the outlet for a range of input spacing (a) normalized average and maximum fitness as function of generation, (b) synchronization metric and diversity metric for MLNs arranged in ascending order of fitness value, (c) two structures from the final population with best fitness and best synchronization metric, (d) transformation of inlet spacing as a pair of droplets move in the ladder network in accordance with one embodiment of the present invention.
Figure 8B:
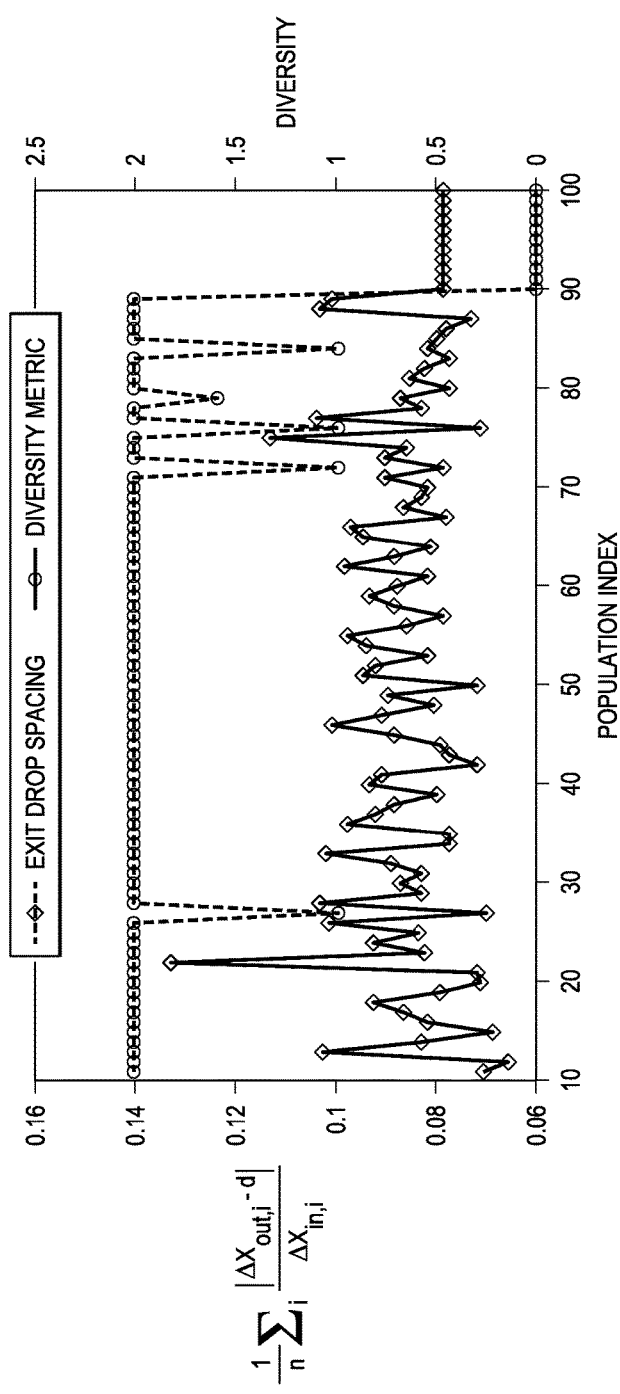

In the above equation, the value of d is 2200 μm. The simulation is terminated after 25K generations. Similar to previous case studies, the maximum fitness increases at discrete intervals as shown in FIG. 8A. Interestingly, in this case, the average fitness changed before the maximum fitness. FIG. 8B, shows the diversity and the delay metric, δ, where δ=

$$1/T \left| \sum_i^T \frac{\Delta X_{out,i} - d}{\Delta X_{in,i}} \right|,$$

similar to previous cases there are structures in between $10^{th}$ to $90^{th}$ which have better delay metric compared to the $100^{th}$ structure.

Figure 8C:
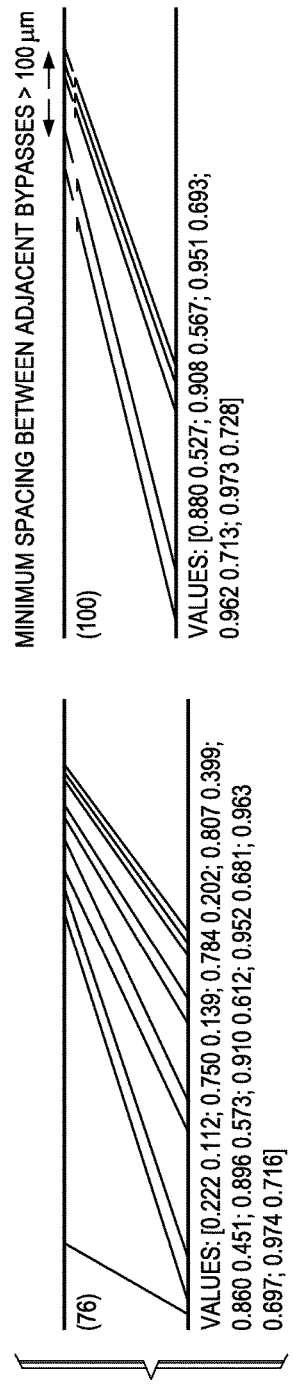

FIG. 8C shows the ladder designs of index 100 and 76. The design with index 100 expands droplets to specific delay d, with minimum number of bypasses. The elitist does not have the least delay metric (δ) because the objective is to obtain ladder design with minimum number of bypasses. The $76^{th}$ index ladder design has the delay metric less compared to the elitist, this implies that this design does better in expanding the drops compared to structure with index 100.

Figure 8D:
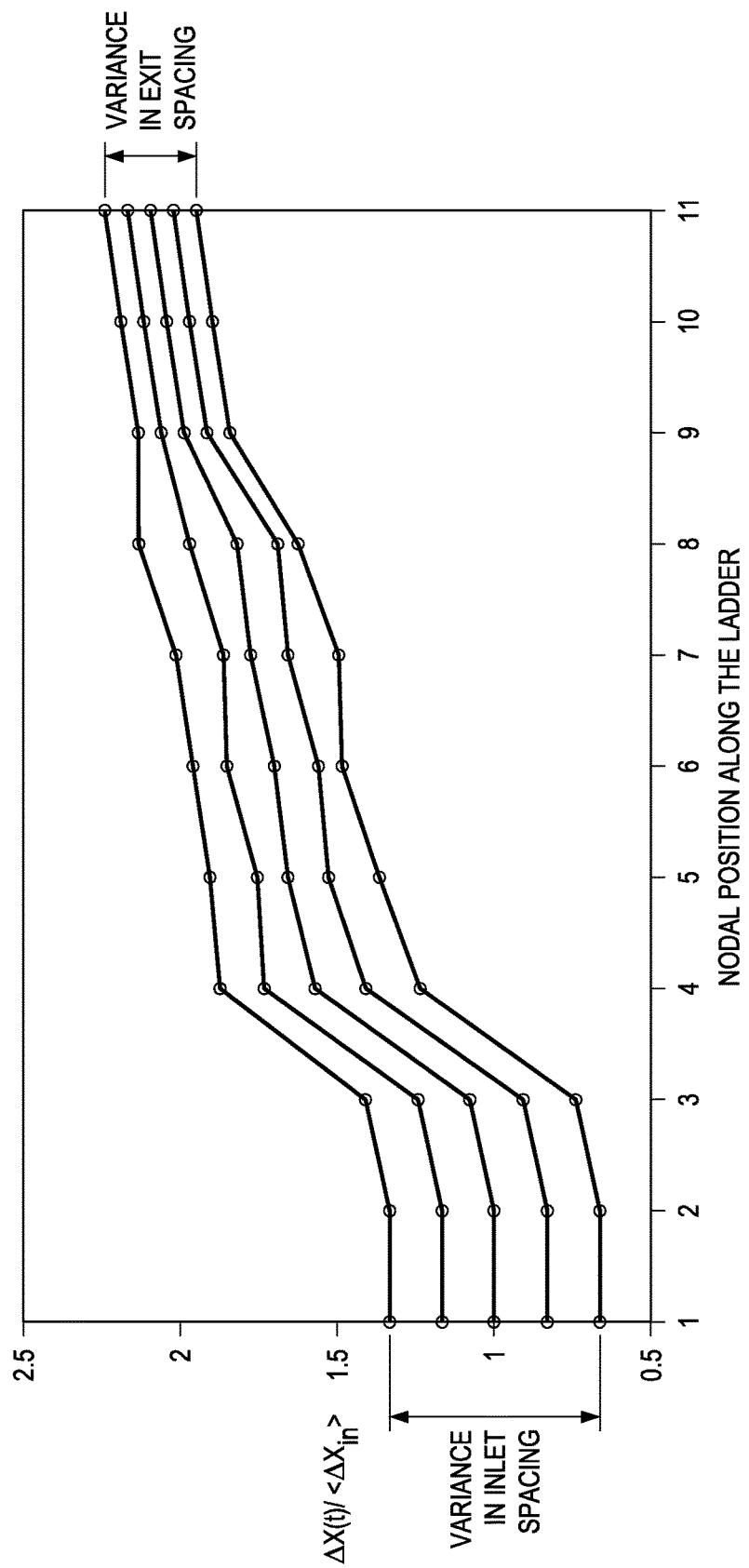

To understand the phenomena of expanding; consider structure with index 100, a pair of drops enter the ladder network with 700 μm of inter drop spacing. The bottom drop enters the ladder network and slows down whereas the top droplet comes with the initial speed expanding the relative spacing between the drops. By the time top droplet comes to the first node, the bottom drop is caught in several bypasses that the velocity of the bottom drop is always lower than the top drop. Therefore, by the time the top drop comes out of the ladder the spacing is increased to 2000 μm. That is an increase of three times the inlet spacing. In case of 1400 μm, spacing due to similar dynamics, the spacing has increased to 2400 μm which is an increase of 1000 μm. The objective was to increase drops coming in between 700-1400 μm to 2200 μm. Therefore a variation of 700 μm at the inlet is reduced to a variation of 400 μm at the exit. This ladder structure has reduced about 42% variation at the inlet spacing. For example, FIG. 8D shows the transformation of various inlet spacings to exit spacings as a pair of droplets move node by node through the ladder network.

Every bypass in the ladder network is important to achieve this particular transformation of droplet spacing, but the extent they a affect the functionality varies. For example, in case of ladder network with index 100, removing the last bypass changes the functionality by 5% whereas removing the first bypass changes the functionality by 20%.

In case of ladder network with index 76 at the lower limit of the inlet spacing, exit spacing is 2100 μm, which is 100

µm higher than structure with index 100. At 1400 µm, the exit spacing is 2300 µm, that is a decrease of 100 µm from 100$^{th}$ structure. In case of structure with index 76, the exit variation is just 200 µm for a 700 µm variation in the inlet. That is a reduction of 71% variation from the inlet. Interestingly, in this case, similar to previous example, the first bypass reduces the inlet spacing and the other bypasses increases the spacing. Further due to diversity factor there are 80 different MLNs that transform pairs of droplets to have a fixed delay as they exit.

A custom genetic algorithm is formulated for designing microfluidic ladder networks. Using this technique, three different ladder network designs are uncovered. The first design synchronizes a pair of drops. Second structure along with synchronization reduces the variance in the inlet spacing. Third structure enhances drops coming at a range of inlet spacing to a particular value. The objective functions are based on the exit spacing but the proposed approach can be used for any generic ladder structures that involve more complex spatial and temporal control of droplets. Further, it is considered that only pairs of drops described herein can be easily extended to trains of drops. Another outcome of GA is that the design rules follow evolution principles, as microfluidic ladder designs are widely observed in nature, the proposed approach can be used to understand the objective of a particular design, which could lead to better understanding of transport of systems in nature. Network model uses simple rules to match experimental scenarios but the non-linearities of droplet motion at the junctions might pose other challenges in designing these networks. Finally, the approach shown here is not limited only to ladder networks. In general, these principles can be used to design any complex microfluidic systems.

Figure 9:
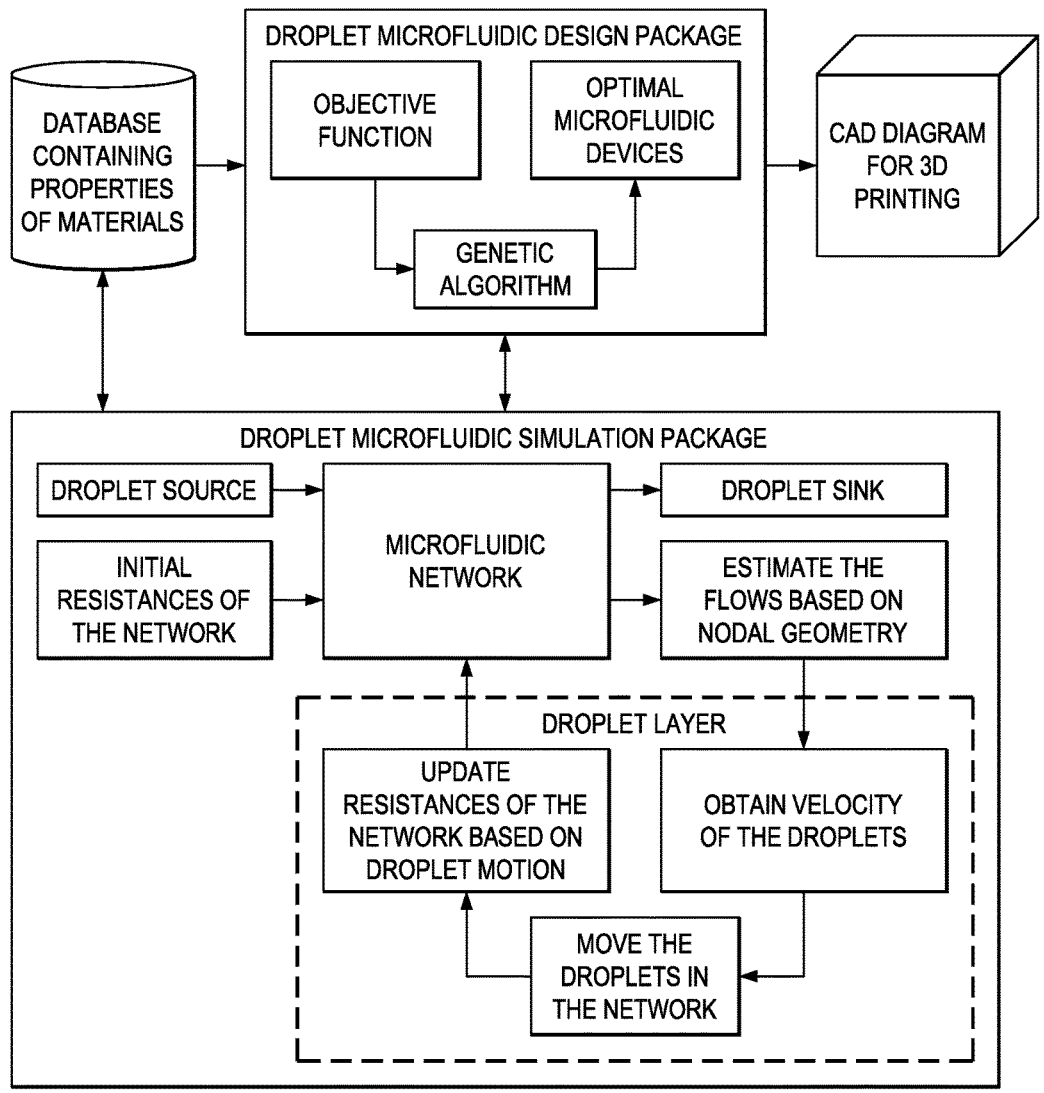
FIG. 9 depicts a block diagram of an apparatus for modeling and simulation of large-scale microfluidic devices in accordance with one embodiment of the present invention.

As will be demonstrated in the following discussion, the present invention provides an efficient computational platform for simulation of large-scale droplet microfluidic system. Further, the present invention provides a flexible, transparent, and efficient genetic algorithm approach that uses the computational platform developed through the first aim for design of reduced footprint, multifunctional devices. The final designs are exported in a CAD format for rapid prototyping using 3D printers. The system is depicted in FIG. 9 and will be described in reference to FIGS. 10-15.

Figure 10:
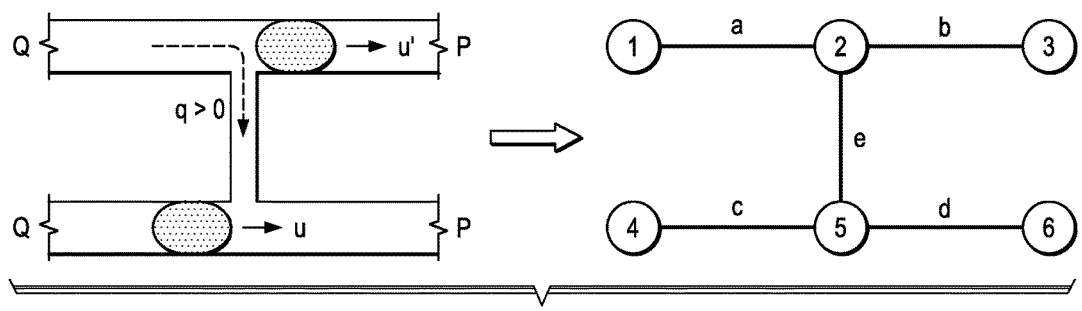
FIG. 10 depicts a decomposition of ladder device into nodes in accordance with one embodiment of the present invention.

Two important ideas underlie the development of a computationally tractable tool for droplet motion simulation in large-scale networks. The first idea addresses the difficulty in simulating droplet motion that arise because of channel resistances varying over time based on droplet positions. To address this problem, a decomposition strategy shown in FIG. 10 is used. As shown in FIG. 10, simulations will be started with initial resistances for the branches. Based on this initialization, flow-pressure calculations will be performed. This will establish the flow of the bulk fluid in all the branches of the network, which allows the calculation of all the droplet velocities. After the velocity computations, droplets can be transported in the network until they reach various nodes and are ready to relocate to different branches. After the droplet decisions are made, branch resistances are recalculated. At this point, the flow-pressure network calculations need to be performed again and this process is repeated till all the droplets exit the network or when some other termination criterion is met. Now, the second idea deals with the granularity of the network representation for the flow-pressure simulations. The network is represented at a much lower granularity as nodes and branches. Using this representation a GA approach manipulating this representation can encompass a remarkably rich set of architectures.

First, every device in the microfluidic network is broken down into a combination of nodes and branches. As an example, consider the ladder network with a single bypass and the boundary conditions specified as constant flow at the inlet and constant pressure at the outlet. The network is converted into a stick diagram (node-branch diagram) as shown in the FIG. 10. The flow network solution for a such a stick diagram will now be discussed. Existing algorithms work on two main principles: (i) sum of all flows at a node is zero; and (ii) sum of all pressure drops across a loop or mesh is zero [47]. The present invention solves a system of linear equations because flows in microfluidic devices are laminar. The single bypass ladder network has n=6 nodes, and b=5 branches. The objective is to solve for flows in all these branches. The numbers of unknowns in this case are: (i) Pressure at all nodes—Pnode (nx1); (ii) Flows in all branches—Qbranch (bx1); and (iii) Flows into all nodes—Qnode (nx1). Introducing flow variables at every node will render any node to be arbitrarily assigned as source or sink in a design optimization process. In the first stage the network is converted into an incidence matrix (A). The A matrix has dimensions of 'b' by 'n'. The elements of the incidence matrix are either 0, 1 or −1. If a bypass b1 is not connected to node n1 then the value A(1,1) is 0. Otherwise, based on the flow direction it is either 1 or −1. Since every branch is between two nodes, summation of all the elements in each row is zero.

$$A = \begin{pmatrix} -1 & 1 & 0 & 0 & 0 & 0 \\ 0 & -1 & 1 & 0 & 0 & 0 \\ 0 & 0 & 0 & -1 & 1 & 0 \\ 0 & 0 & 0 & 0 & -1 & 1 \\ 0 & -1 & 0 & 0 & 1 & 0 \end{pmatrix}$$

$$R = \begin{pmatrix} R1 & 0 & 0 & 0 & 0 & 0 \\ 0 & R2 & 0 & 0 & 0 & 0 \\ 0 & 0 & R3 & 0 & 0 & 0 \\ 0 & 0 & 0 & R4 & 0 & 0 \\ 0 & 0 & 0 & 0 & R5 & 0 \\ 0 & 0 & 0 & 0 & 0 & R6 \end{pmatrix}$$

Mass balance at each node implies $Q_{node}=\Sigma_{node}Q_{branch,i}$, therefore $A^T_{n \times b}Q_{branch}=Q_{node}$. Pressure across a branch is a product of the flow rate and hydraulic resistance $A_{b \times n}P_{node}=R_{b \times b}Q_{branch}$. Based on supply and demand at each node $C_{m \times n}Q_{node}=Q_0$. Positive (negative) flows will imply that the node is a source (sink) and zero flows will imply this is an intermediate junction. The C matrix has dimensions m by n, where m is the number of flows that are specified. $Q_0$ is the flow boundary condition at nodes. Similarly the boundary conditions for pressure are given as $D_{q \times n}P_{node}=P_0$. The D matrix has dimensions of q by n, where q is the number of nodal pressures that are specified. Consolidating all the equations:

$$A^T Q_{branch} - Q_{node} = 0$$

$$A P_{node} - R Q_{branch} = 0$$

$$C Q_{node} = Q_0$$

$$D P_{node} = P_0$$

Writing the equations in block matrix form:

$$\begin{pmatrix} A & -R & 0 \\ 0 & A^T & -I \\ 0 & 0 & C \\ D & 0 & 0 \end{pmatrix} \begin{pmatrix} P_{node} \\ Q_{branch} \\ Q_{node} \end{pmatrix} = \begin{pmatrix} 0 \\ 0 \\ Q_0 \\ P_0 \end{pmatrix}$$

The dimension of the left hand side matrix is (m+q+b+n) by (2n+b); a unique solution would require the number of boundary conditions (m+q) to be equal to n. Therefore at every node either the pressure or flow needs to be specified to solve the system of equations. For the ladder example:

$$C = \begin{pmatrix} 1 & 0 & 0 & 0 & 0 & 0 \\ 0 & 0 & 0 & 1 & 0 & 0 \\ 0 & 1 & 0 & 0 & 0 & 0 \\ 0 & 0 & 0 & 0 & 1 & 0 \end{pmatrix}$$

$$D = \begin{pmatrix} 0 & 0 & 1 & 0 & 0 & 0 \\ 0 & 0 & 0 & 0 & 0 & 1 \end{pmatrix}$$

Figure 11:
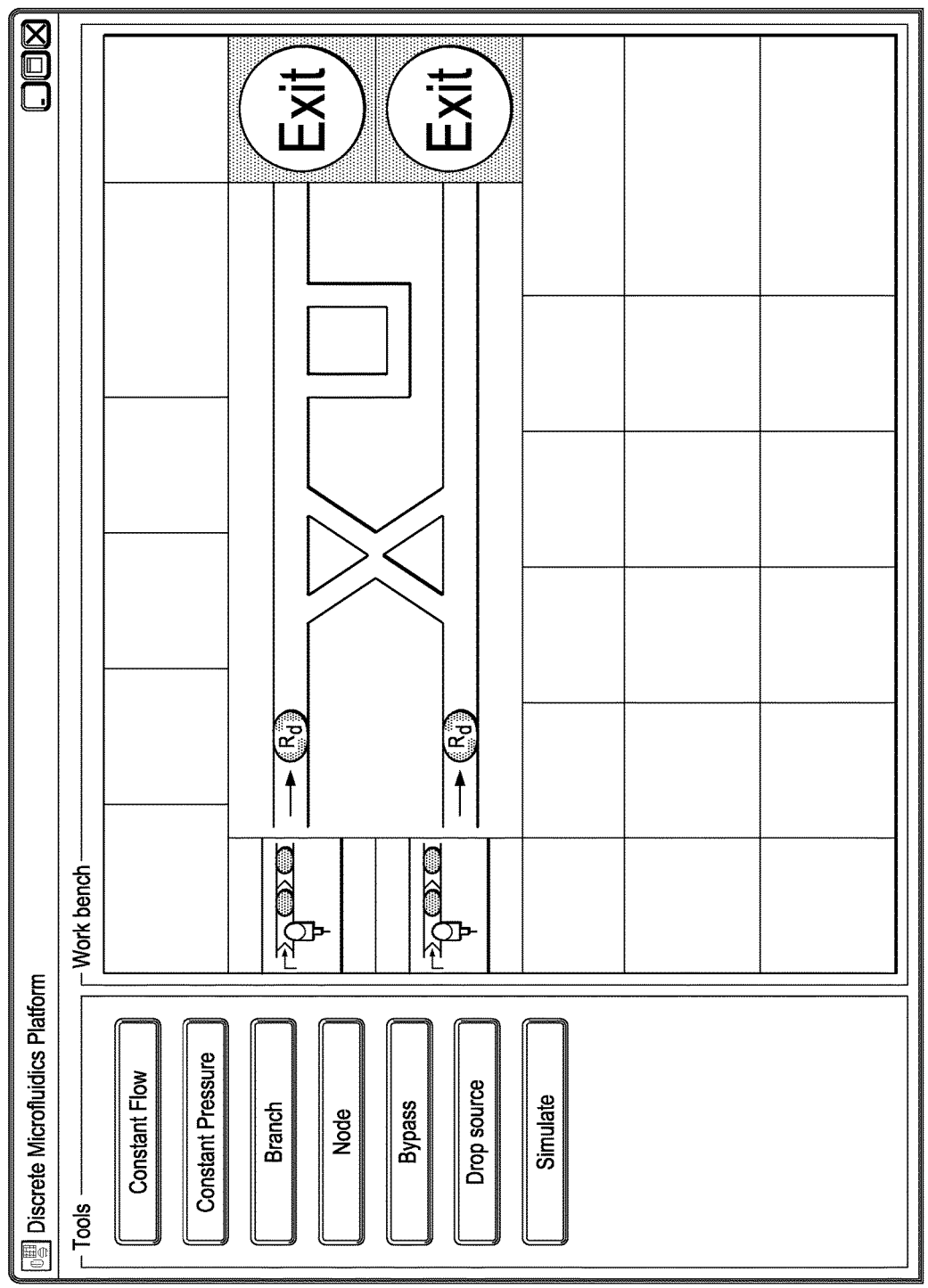
FIG. 11 depicts a proposed software tool for modeling complex microfluidic networks in accordance with one embodiment of the present invention.

Based on the consolidated matrix, the system of equations can be solved. As mentioned before, once this solution is achieved, one can calculate the droplet velocities and times at which the droplets will reach nodes. When the droplets reach a node, droplet decisions are made and the resistances are updated and the system of equations is solved again. This simulation loop is continued till all the droplets exit the device. The computational software to simulate microfluidic systems is shown in FIG. 11.

Once the network is assembled and boundary conditions are specified then the algorithm in FIG. 9 is used to solve the droplet motion. The computational approach ensures that consistent boundary conditions are generated. This is important because, for example, in the ladder structure, specifying flows at all nodes is not consistent as either the network will be unsolvable (if the inlet and outlet flow specifications don't match) or there will be infinite number of solutions if the flow specifications are consistent (as only differential pressures across branches can be calculated). It is worth pointing out that this computational tool with a Graphical User Interface (GUI) will allow a designer to verify how well a prototype he/she has in mind will perform. However, when this tool is integrated with the GA, the design approach directly accesses the algorithms that underlie the tool in the numerical calculation of the design objective.

The process of simulating an operation of one or more of the possible designs for the discrete droplet microfluidic system may include the following steps: (a) defining one or more droplets at one or more inlets of the discrete droplet microfluidic system, wherein the one or more inlets are set as the current nodes; (b) calculating a total resistance ($R_t$) of each channel connected to the current nodes using:

$$R_t = R + R_d$$

$$R = \frac{12\,\mu L}{h^3 w}\left[1 - \sum_r \frac{1}{r^5} \frac{192}{\pi^5} \frac{h}{w} \tanh\left(\frac{r\pi w}{2h}\right)\right]^{-1}$$

where:
R is a resistance of the channel,
$R_d$ is a resistance of the droplet,
h, w, and L are the height, width and length of the channel, respectively,
u is the bulk phase viscosity,
r is the series index which takes only odd values;
(c) calculating a flow in each channel from the current nodes using $Q_{node} = \Sigma Q_i$, where $Q_{node}$ is the flow into or out of the node and the flow in each channel is $Q = R_t/\Delta P$; (d) calculating a velocity of the one or more droplets ($V_d$) based on the flow in the channel using $V_d = \kappa c Q_i$—where slip factor ($\kappa$) is 1.4; (e) moving each droplet through the discrete droplet microfluidic system to a next node and set the current node equal to the next node; (f) repeating steps (b), (c), (d) and (e) until all the droplets exit the one or more outlets of the discrete droplet microfluidic system; and (g) displaying or outputting one or more results of the simulation to the one or more output devices. Steps (b), (c), (d), (e), (f) and (g) are executed by one or more processors communicably coupled to the one or more output devices.

A GA approach is proposed for the design of large-scale microfluidic networks. As shown in FIG. 9, the droplet microfluidic design package uses the modeling tools to construct several optimal designs based on the specified objectives. The advantage of this is that any complex architecture can be represented by assembling the lowest level model fragments. The major GA components will now be discussed: (i) coding-decoding, (ii) genetic operators such as mutation, one-point crossover, reproduction, and (iii) Fitness function (FIG. 2, 3, 4 or 16A-16C).

Figure 13:
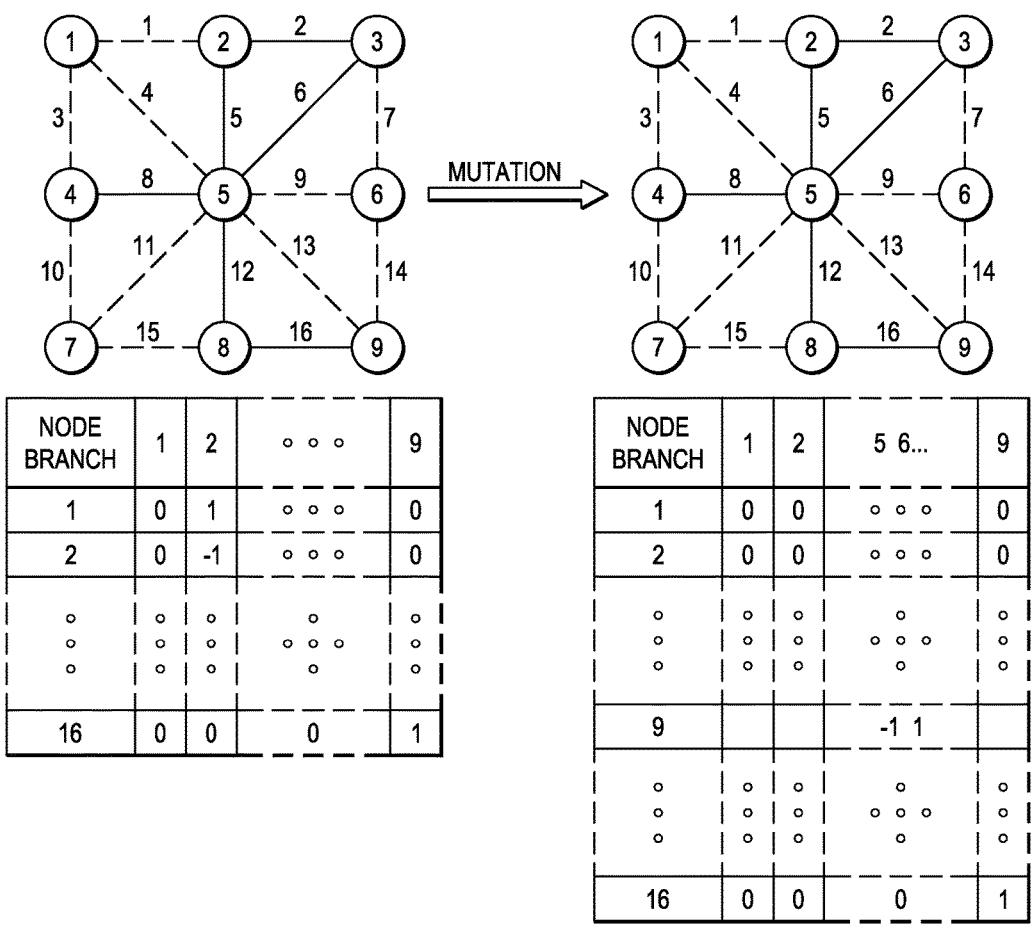
FIG. 13 depicts a mutation in nodal microfluidic networks in accordance with one embodiment of the present invention.
Figure 14:
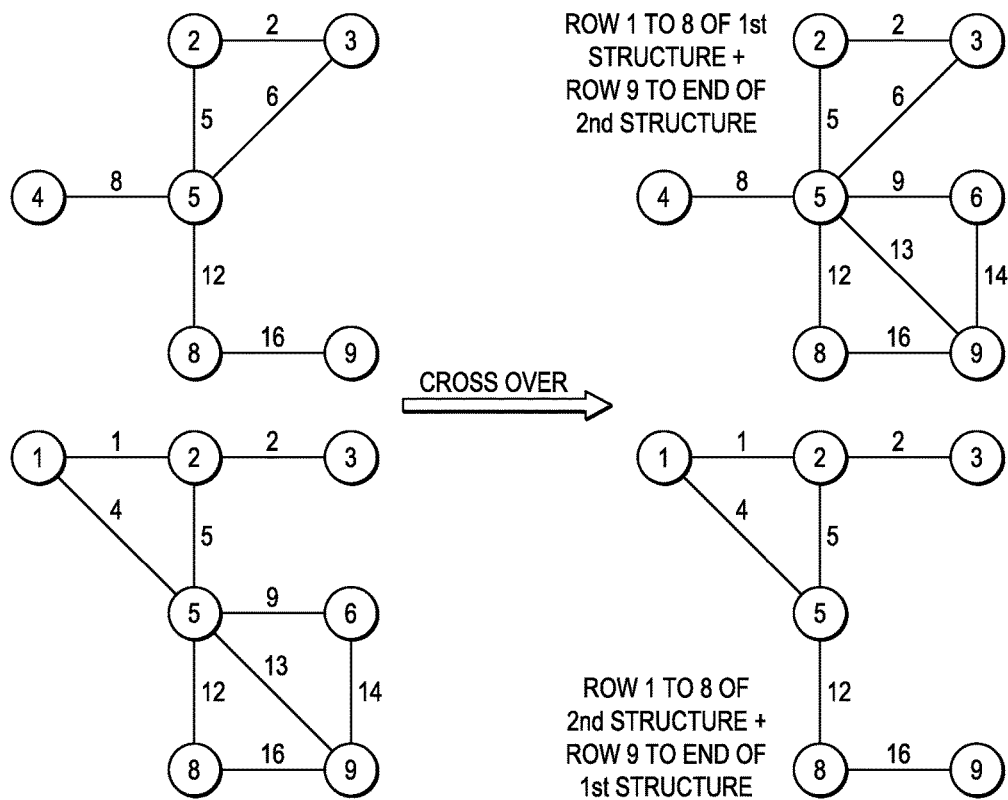
FIG. 14 depicts a one-point crossover in nodal microfluidic networks in accordance with one embodiment of the present invention.

In present invention's GA approach, microfluidic networks are coded into an incidence matrix. As seen from the previous section, the incidence matrix represents the geometry of the network. Consider an exemplar network shown in FIG. 12A where a network with maximum 9 nodes is considered. The solid lines between the nodes imply that a branch exists between the nodes, whereas a dashed line between the nodes implies absence of a branch. The incidence matrix for this network geometry is represented in FIG. 12B. Some of the rows in the matrix are completely zero, since there is no branch between these nodes. Therefore the incidence matrix at the first level contains redundant information. It is important to retain this redundant information as this makes it possible to apply the genetic operators on structures of comparable sizes. If the redundant information were not retained, the algorithm development will become extremely cumbersome. However, one could easily decode this structure by simply dropping the zero rows and columns as shown in FIG. 12D, which leads to the node-branch architecture shown in FIG. 12C. In case of mutation, branches from the structure are randomly added or deleted. FIG. 13 shows an example of mutation. As a result of this mutation, the decoded structure looses the second branch and gains the ninth branch (FIG. 13). The one-point crossover genetic operator picks a random branch number to crossover structures from two parents to produce two offsprings. In the example shown (FIG. 14), assuming that the random branch number that was generated was 8, the first (second) offspring has branches 1 to 8 branches as that of parent 1 (parent 2) and branches 9 to 16 as that of parent 2 (parent 1). The length and resistance for each branch are real numbers, for which GA operators have been designed and tested in previous work [48,49]. Notice, how this combination beautifully captures variegated structures; for example, a structural stick diagram of FIG. 8 with branch lengths and resistances with generalize to any slanted ladder structure.

The objective of reproduction is to create future generations of structures from the existing population. The GA algorithm is initialized by generating 'N' random structures. Genetic operators are used on these structures and new geometries are populated. As the population size increases to '2N', reproduction step is performed in such way that 'N' networks from the '2N' population are picked. The reproduction step will be performed using a combination of elitist and diversity principles. The elitist approach will pick structures with maximum fitness. However, if all these structures are very similar, it is possible that the GA approach could get stuck in a local optimum. To avoid this some structures, which are very different from the fittest structures but still with acceptable fitness will be propagated to the next generation. The design objective decides the fitness function. In fact, the success of the GA algorithm depends on identifying appropriate fitness functions; however it is not possible to write down one general fitness function as this is a case-specific enterprise. For example, if the goal was to achieve an AABB sequence at the exit, given sources for A, B droplets, a fitness function based on Hamming distance [50] between strings will be appropriate. If synchronization of trains of droplets at different locations in the network is important then an appropriate fitness function is $F=e^{-\alpha \Sigma_i \Delta T_i}$, where $\Delta T_i$ represents droplet timing difference at different locations Actuator selection can also be quite easily included in the proposed GA approach. This is achieved by extending the coding to include one more column, the elements of which are 1 if the branch represented by that row has an actuator placed and 0 otherwise. The mutation and one-point crossover operators can be easily extended to work with the augmented coding. The beauty of this extension is that it allows one to study any control algorithm for the actuation. The control algorithm can be model predictive control or a simple PID or a different neural network based control. Since the fitness function calculations are based on simulations, setting up the GA is a simple matter of adding the controller calculations to the droplet motion simulations. Going even further, appropriate control algorithm selection can also be included as a part of the design problem. For example, if one were interested in testing three different control algorithms, adding two more binary numbers to the coding scheme for each branch will suffice. Each of the three algorithms will be represented by a binary coding of 01, 10 and 11. For every branch that has an actuator, decoding of the algorithm string will decide the control approach to be used. Similar ideas can be used to include choices for actuation mechanisms (such as electrical signals) in addition to the resistance modulation. Of course, adding more functionality will lead to increase in computational complexity, which will be discussed next.

Figure 15:
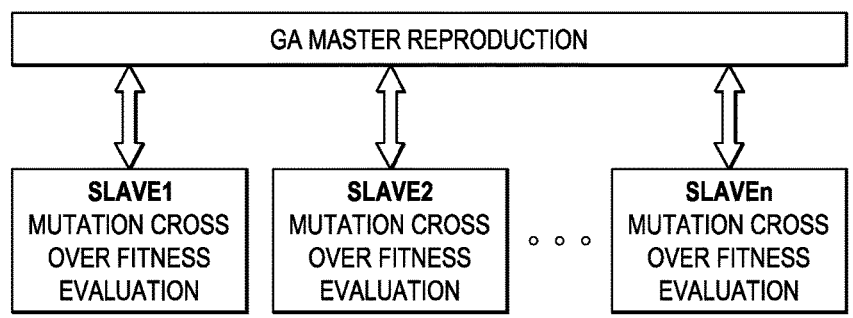
FIG. 15 depicts an implementation of a parallel GA in accordance with one embodiment of the present invention.

Since design problems with thousands of nodes need to be solved, a parallelized version of the GA approach [51] is shown in FIG. 15. The biggest computational expense in the GA approach is the calculation of the fitness function as every fitness function evaluation will require large-scale network simulations. In the proposed parallel GA, the master controller will make the ultimate decision on which structures will be carried over to the next generation. Once that decision is made, the master controller will pass on a certain number of structures to the slave controllers so that they can enhance the population and return the enhanced population to the master. In this manner, the most computationally intensive step of the GA approach is parallelized.

Figure 16A:
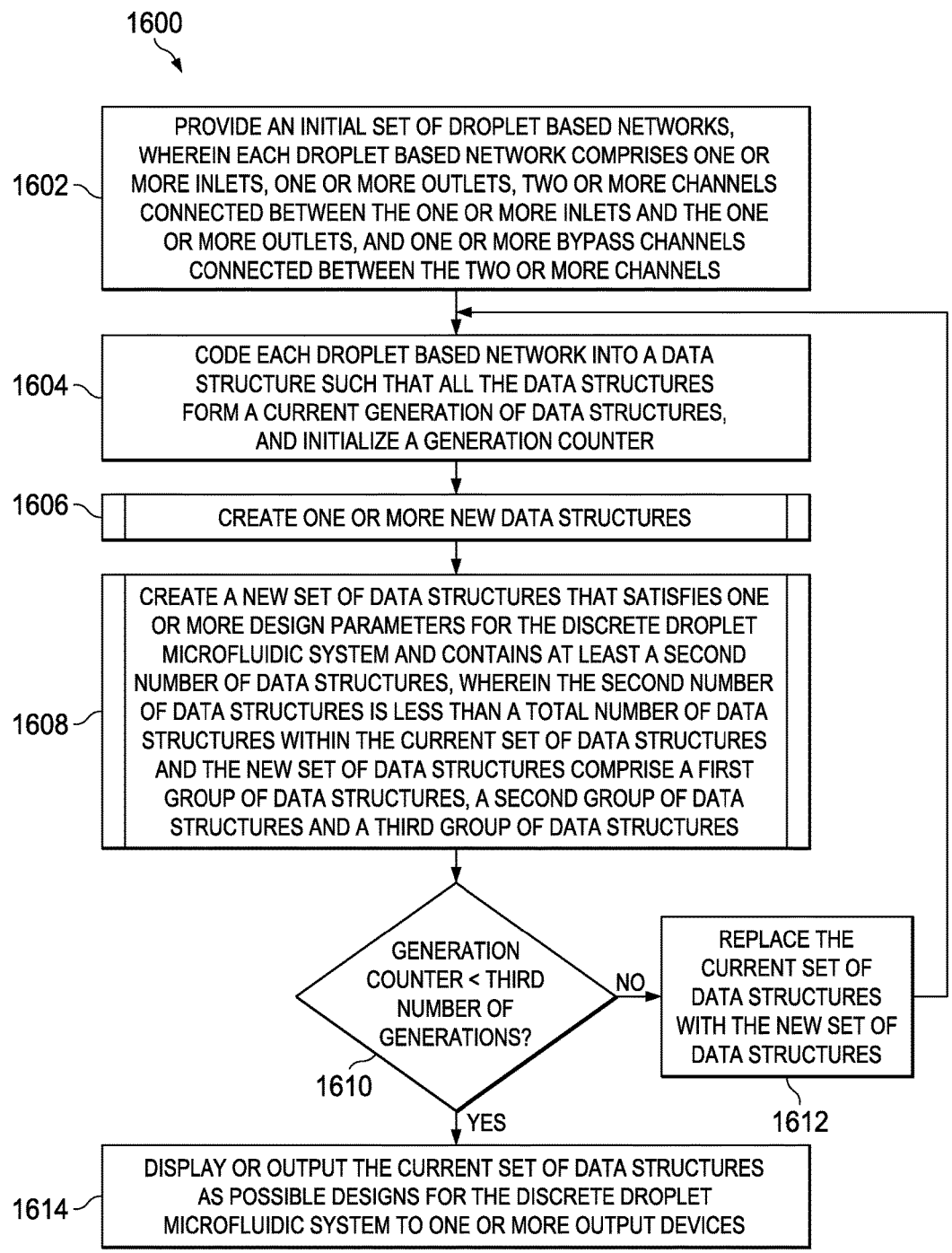
FIGS. 16A-16C depict a flow chart of a method for designing a discrete droplet microfluidic system in accordance with another embodiment of the present invention.
Figure 16B:
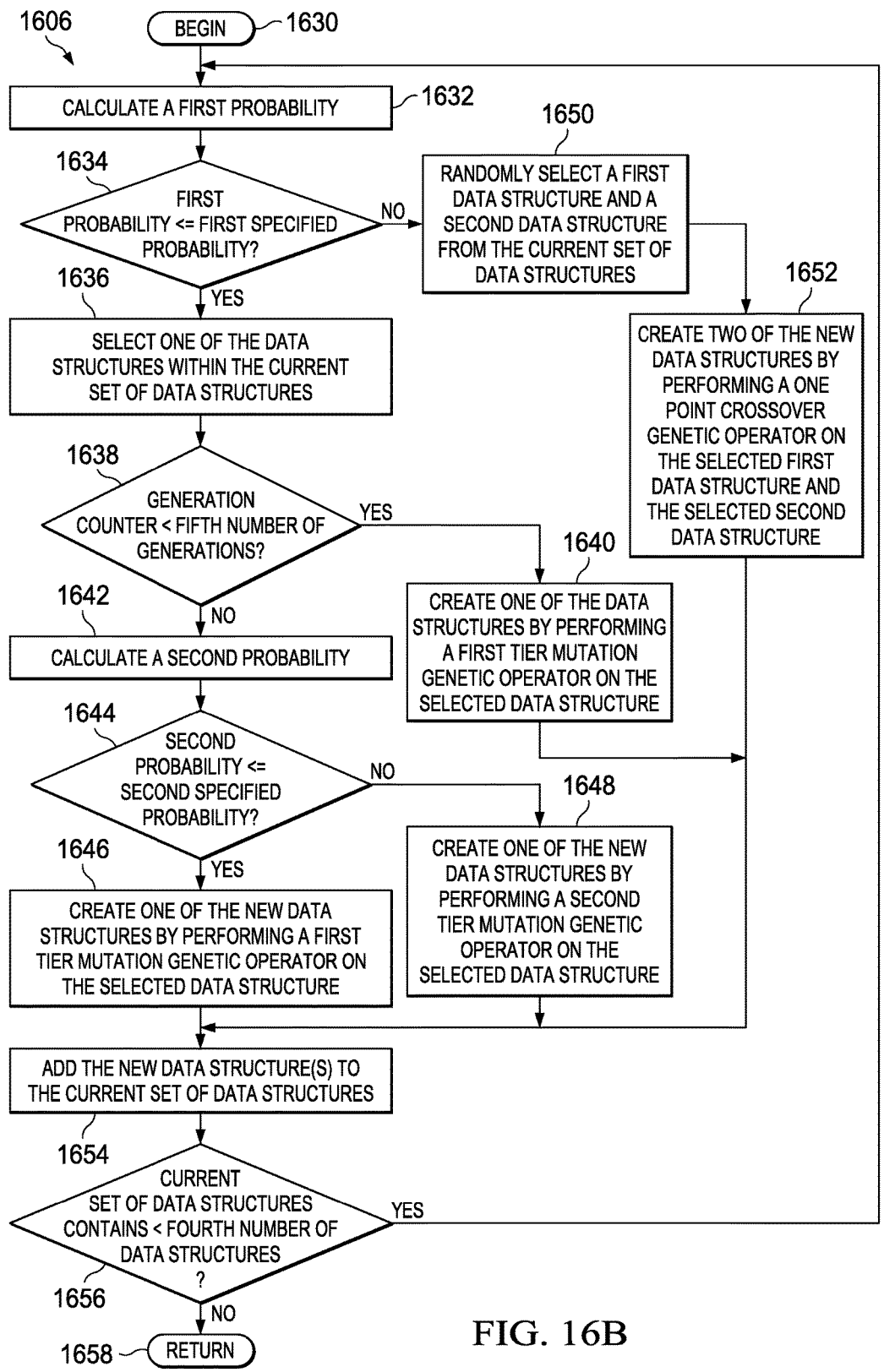
Figure 16C:
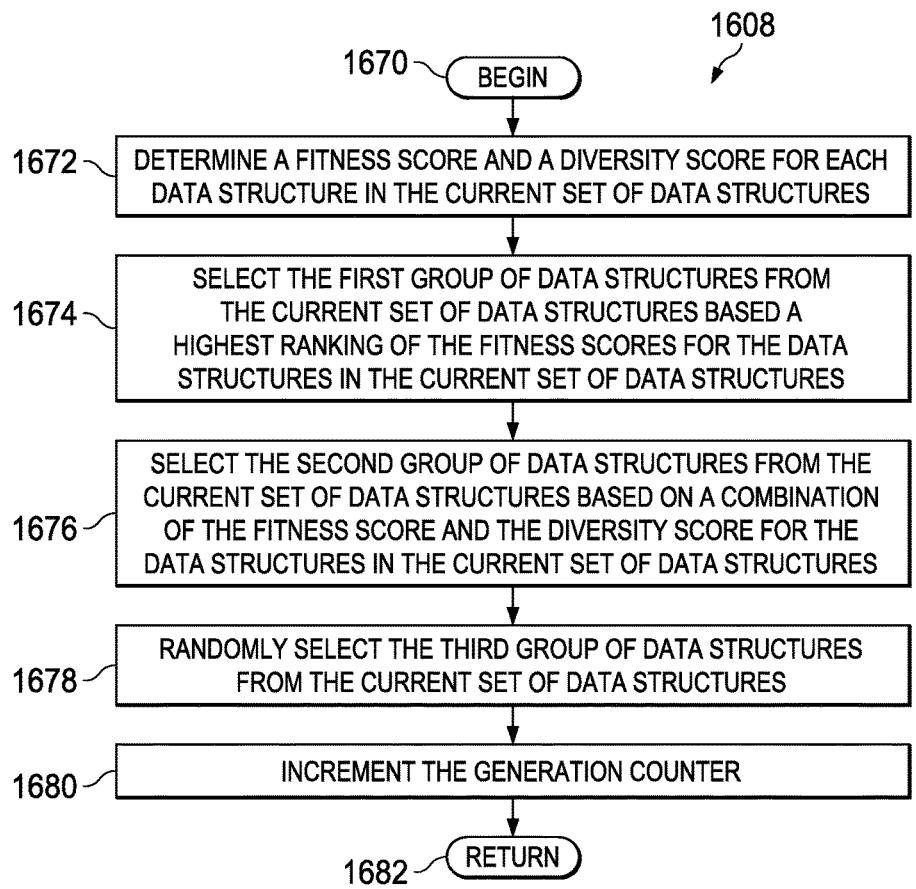

Now referring to FIGS. 16A-16C, a flow chart of a computerized method 1600 for designing a discrete droplet microfluidic system in accordance with another embodiment of the present invention is shown. An initial set of droplet based networks containing a first number of droplet based networks is provided in block 1602. Each droplet based network comprises one or more inlets, one or more outlets, two or more channels connected between the one or more inlets and the one or more outlets, and one or more bypass channels connected between the two or more channels. Each droplet based network is coded into a data structure such that all the data structures form a current set of data structures, and initializing a generation counter in block 1604. One or more new data structures are created in block 1606 (See FIG. 16B). A new set of data structures are created in block 1608 (See FIG. 16C). The new set of data structures satisfy one or more design parameters for the discrete droplet microfluidic system and contains at least a second number of data structures. The second number of data structures is less than a total number of data structures within the current set of data structures. The new set of data structures comprise a first group of data structures, a second group of data structures and a third group of data structures. If the generation counter is less than a third number of generations, as determined in decision block 1610, the current set of data structures are replaced with the new set of data structures in block 1612, and process loops back to block 1604 and repeats the process previously described. If, however, the generation counter is equal to the third number of generations, as determined in decision block 1601, the current set of data structures are displayed or output as possible designs for the discrete droplet microfluidic system to one or more output devices. Blocks 1604-1614 are executed by one or more processors communicably coupled to the one or more output devices.

Referring now to FIG. 16B, the process 1606 to create the one or more data structures begins in block 1630. A first probability is calculated in block 1632. If the first probability is less than or equal to a first specified probability, as determined in decision block 1634, one of the data structures are selected within the current set of data structures in block 1636. If the generation counter is less than a fifth number of generations, as determined in decision block 1638, one of the new data structures are crated by performing a first tier mutation genetic operator on the selected data structure in block 1640. If the generation counter is equal to or greater than the fifth number of generations, as determined in decision block 1638, a second probability is calculated in block 1642. If the second probability is less than or equal to a second specified probability, as determined in decision block 1644, one of the new data structures are created by performing a first tier mutation genetic operator on the selected data structure in block 1646. If, however, the second probability is greater than the second specified probability, as determined in decision block 1644, one of the new data structures are created by performing a second tier mutation genetic operator on the selected data structure in block 1648. If, however, the first probability is greater than the first specified probability, as determined in decision block 1634, a first data structure and a second data structure are randomly selected from the current set of data structures in block 1650, and two of the new data structures are created by performing a one point crossover genetic operator on the selected first data structure and the selected second data structure in block 1652. After completion of the steps described in block 1640, 1646, 1648 or 1652, the new data structure(s) are to the current set of data structures in block 1654. If the current set of data structures contains less than a fourth number of data structures, as determined in decision block 1656, the process loops back to block 1632 and the process repeats as previously described. If, however, the current set of data structures is equal to the fourth number of data structures, as determined in decision block 1656, the process return to the main process of FIG. 16A in block 1658.

Referring now to FIG. 16C, the process 1608 to create the new set of data structures begins in block 1670. A fitness score and a diversity score is determined for each data structure in the current set of data structures in block 1672. The first group of data structures are selected from the current set of data structures based a highest ranking of the fitness scores for the data structures in the current set of data structures in block 1674. The second group of data structures are selected from the current set of data structures based on a combination of the fitness score and the diversity score for the data structures in the current set of data structures in block 1676. The third group of data structures is randomly selected from the current set of data structures in block 1678. The generation counter is incremented in block 1680 and the process return to the main process of FIG. 16A in block 1682.

In one embodiment, the fourth number of data structures is approximately equal to two times the first number of droplet based networks in the initial set of droplet based networks, the fifth number of data structures is approximately equal to 200, and the second number of data structures is approximately equal to the first number of droplet based networks in the initial set of droplet based networks. The first group of the new data structures contains approximately 10% of the second number of data structures, the second group of the new data structures contains approximately 80% of the second number of data structures, and the third group of the new data structures contains approximately 10% of the second number of data structures. In addition, the process may include the step of increasing the third group of the new data structures and decreasing the second group of new data structures whenever the new data structures are less than 80% diverse.

In addition, the present invention provides a non-transitory computer readable medium encoded with a computer program for designing a discrete droplet microfluidic system that when executed by one or more processors perform the steps described above in reference to blocks 306-316.

Moreover, the present invention provides an apparatus for designing a discrete droplet microfluidic system that includes one or more processors, a memory communicably coupled to the one or more processors, and one or more output devices communicably coupled to the one or more processors. The one or more processors perform the steps described above in reference to block 306-316.

Figure 17:
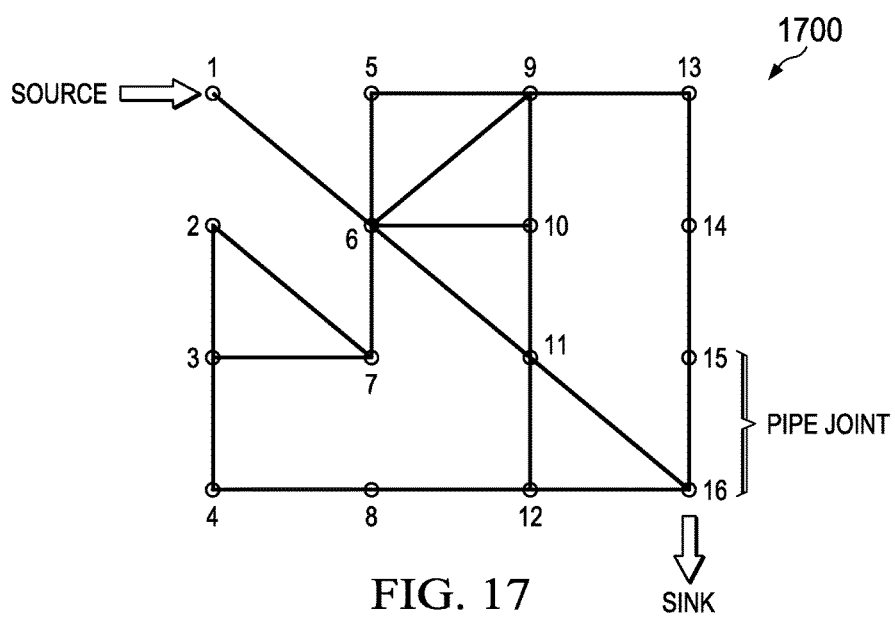
FIG. 17 depicts an example of designing a large-scale microfluidic device in accordance with another embodiment of the present invention.

Now referring to FIG. 17, an example of designing a large-scale microfluidic device in accordance with another embodiment of the present invention is shown. Consider the grid pattern 1700. The pattern can be transformed into an adjacency matrix (A), for a grid of m×m, the matrix is given as follows:

$A_{m^2 \times m^2}(i,j)=0$ — if no connection exists between node $i$ and $j$ $A_{m^2 \times m^2}(i,j)=1$ — if a connection exists between node $i$ and $j$ The maximum number of variables required in the matrix for a grid of m×m is given by the following equation:

$p=(m-1)(4m-2)$

The variables $\{x_1, x_2, x_3 \ldots x_p\}\{\epsilon 0, 1\}$, each of the variables represent if the connection is present or not, a value of 1 implies there is a joining.

To achieve a specific sequence of drops at the exit the fitness function is given by the Hamming distance $H=\text{abs}(S_i-S_d)$ where:
$S_i$ is the sequence produced by the simulation; and
$S_d$ is the desired sequence.

The constrains for the optimization problem are given as: (i) there should always be a connection between source and sink, (ii) there should not be any case when a pipe is hanging without any connections, and (iii) the pipes cannot intersect other than at a node. These constraints are converted into equations given below:

$A^{m^2-1}(\text{sources,sinks})>1$ $A^{m^2-1}(\text{sources,node}_k)>1$ $x_i+x_j \leq 1$ where:
$\text{node}_k$ is a node number that has a value 1;
$x_i$ and $x_j$ are variables that define connections.
These equations are transformed into a nonlinear constrain: $C\ X \leq b$.

Problem formulation for optimizing design structures for given objective function on sequencing is given as follows:

Minimize $H(x_1, x_2, \ldots, x_p)$

Subject to:
$(x_1, x_2, \ldots, x_p) \in \{0, 1\}$
$A^{m^2-1}(\text{sources},[\text{sinks,node}_k])>1$
$C\ X \leq b$ A simulation of a complex device can be viewed at: youtube.com/watch?v=hxHe6kY3obs Using the above objective function and the genetic algorithm proposed herein, the following result for a device that can separate drops coming in a sequence is obtained and can be viewed at:
youtube.com/watch?v=tS1OI6bbCMY The present invention will find applications in any microfluidic design problem that requires precise manipulation of droplets in space and time in an interconnected network. While there are many applications that require these characteristics, one noteworthy application is related to combinatorial chemistry [34,44,52-55]. Another application with similar features is related to drug screening [54,56,57]. Once the approach is validated on these types of applications, the basic units can be enhanced even further to broaden the applicability of the proposed tool for applications in fields that are not covered by the proposed tool but where the proposed computational paradigm is still relevant.

The generality of the representation proposed herein can lead to the identification of a large number of exciting design configurations that is simply not possible to uncover using experimentation/forward simulations. This is really the computational analog of the combinatorial chemistry concept, where a computational tool searches a vast design space to reveal not easily discoverable designs. Finally, discovery of robust, reduced footprint, highly multifunctional device designs, which incorporate several intriguing substructures for real-life problems, will revolutionize the field of design of droplet-based microfluidic systems.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

The invention claimed is:

1. A computerized method for designing a discrete droplet microfluidic system comprising the steps of:
   (a) providing an initial set of droplet based networks containing a first number of droplet based networks, wherein each droplet based network comprises one or more inlets, one or more outlets, two or more channels connected between the one or more inlets and the one or more outlets, and one or more bypass channels connected between the two or more channels;
   (b) coding each droplet based network into a data structure such that all the data structures form a current set of data structures;
   (c) creating one or more new data structures by performing one or more genetic operators on one or more selected data structures from the current set of data structures;
   (d) adding the one or more new data structures to the current set of data structures;
   (e) creating a new set of data structures that satisfies one or more design parameters for the discrete droplet microfluidic system and contains at least a second number of data structures selected from the current set of data structures, wherein the second number is less than a total number of data structures within the current set of data structures, wherein a first group of the new data structures are selected using a fitness score, a second group of the new data structures are selected using a combination of the fitness score and a diversity score, and a third group of the new data structures are selected randomly, and wherein the first group of the new data structures contains approximately 10% of the second number of data structures, the second group of the new data structures contains approximately 80% of the second number of data structures, and the third group of the new data structures contains approximately 10% of the second number of data structures;
   (f) replacing the current set of data structures with the new set of data structures;
   (g) repeating steps (c), (d), (e) and (f) until the new set of data structures has been created a third number of times;
   (h) displaying or outputting the current set of data structures as designs for the discrete droplet microfluidic system to one or more output devices;
   wherein steps (c), (d), (e), (f), (g) and (h) are executed by one or more processors communicably coupled to the one or more output devices; and
   fabricating the discrete droplet microfluidic system based on the displayed or outputted designs using a three-dimensional printer.

2. The method as recited in claim 1, further comprising the step of providing the one or more design parameters for the discrete droplet microfluidic system, wherein the one or more design parameters comprise one or more structural properties, one or more fluid properties or a combination thereof.

3. The method as recited in claim 1, wherein the step of providing the initial set of droplet based networks comprises the step of randomly generating the initial set of droplet based networks.

4. The method as recited in claim 1, wherein:
   the one or more bypasses comprise a backward bypass, a vertical bypass, a forward bypass or a combination thereof; or
   each data structure comprises a total number of bypasses present in the droplet based network, and a position of the bypasses present in the droplet based network.

5. The method as recited in claim 1, wherein the one or more genetic operators comprise a mutation, a one point crossover or a combination thereof.

6. The method as recited in claim 5, wherein:
   the mutation genetic operator creates a new data structure by the step of either (i) adding two new bypass channels to one of the selected data structures, or (ii) adding a new bypass channel to one of the selected data structures or removing an existing bypass channel from one of the selected data structures; and
   the one point crossover genetic operator combines two of the selected data structures to create two new data structures.

7. The method as recited in claim 5, wherein the one point crossover genetic operator:
   randomly selects a first data structure ($TB_1$) having a first portion ($TB_1(1:\zeta-1)$) and a second portion ($TB_1(\zeta:p)$) and a second data structure ($TB_2$) having a first portion ($TB_2(1:\zeta-1)$) and a second portion ($TB_2(\zeta:p)$) from the current set of data structures, where $\zeta$ is a random integer generated from 1 to length of the TB group (p);
   creates a first new data structure (TB') and a second new data structure (TB") as follows:

$$TB'=[TB_1(1:\zeta-1)TB_2(\zeta:p)]$$

$$TB''=[TB_2(1:\zeta-1)TB_1(\zeta:p)]; \text{ and}$$

generates a first real value (V') for the first new data structure (TB') and a second real value (V') for the second new data structure (TB') as follows:

$$V'=\gamma V_1+(1-\gamma)V_2$$

$$V''=(1-\gamma)V_1+\gamma V_2$$

where: $V_i$ is a first real value for the first data structure, $V_2$ is a second real value for the second data structure, and $\gamma$ is a random number between 0 and 1.

8. The method as recited in claim 5, wherein the mutation genetic operator is used whenever a first probability is calculated to be less than or equal to a first specified probability, and the one point crossover genetic operator is used whenever the first probability is calculated to be greater than the first specified probability.

9. The method as recited in claim 8, wherein the mutation genetic operator further comprises a first tier mutation genetic operator and a second tier mutation genetic operator such that the first tier mutation genetic operator is used whenever a second probability is calculated to be less than or equal to a second specified probability and the second tier mutation genetic operator is used whenever the second probability is calculated to be greater than the second specified probability.

10. The method as recited in claim 1, further comprising the step of repeating steps (c) and (d) until the current set of data structures contains at least a fourth number of data structures.

11. The method as recited in claim 10, wherein the fourth number of data structures is approximately equal to two times the first number of droplet based networks in the initial set of droplet based networks.

12. The method as recited in claim 1, wherein the second number of data structures is approximately equal to the first number of droplet based networks in the initial set of droplet based networks.

13. The method as recited in claim 1, further comprising the step of increasing the third group of the new data structures and decreasing the second group of new data structures whenever the new data structures are less than 80% diverse.

14. The method as recited in claim 1, wherein the fitness score is calculated using $$F_1 = \left( \sum_{x_l}^{x_u} |\Delta X_{out,i} - d| + \alpha \frac{n-1}{N} \right)$$

$$F = e^{-\beta F_1}$$

where: d is a particular droplet spacing at the exit with minimum number of bypasses, β and α are normalizing factors,
n is a total number of bypasses,
N is a maximum number of bypasses,
$(\Sigma_{x_l}^{x_u}|\Delta X_{out,i}-d|)$ is a summation of error in outlet spacing for a range of input spacings with the delay d, and $$\left( \frac{n-1}{N} \right)$$

gives a normalized value of the total bypasses.

15. The method as recited in claim 1, wherein the diversity score is calculated using $T_i(j) = \|SC_t(i) - SC_t(j)\|_\infty + \|SC_b(i) - SC_b(j)\|_\infty + \|V(i) - V(j)\|_\infty \forall j = 1:2M$ and $j \neq i$ $D(i) = \text{Min}(T_j) \forall i = 1:n$ where: T(j) gives a maximum variation present in between $i^{th}$ and $j^{th}$ networks,
$SC_t$ and $SC_b$ are top and bottom segment groups,
V is a difference in actual position of the nodes,
vector $T_i$ contains a maximum difference between the choice of segments and nodal positions of $i^{th}$ structure with respect to all other structures, and
D(i), is a diversity metric defined as a minimum value of $T_i$.

16. The method as recited in claim 1, further comprising the step of simulating an operation of one or more of the designs for the discrete droplet microfluidic system.

17. The method as recited in claim 16, wherein the simulation step comprises the steps of:
(a) defining one or more droplets at one or more inlets of the discrete droplet microfluidic system, wherein the one or more inlets are set as the current nodes;
(b) calculating a total resistance ($R_t$) of each channel connected to the current nodes using:

$$R_t = R + R_d$$

$$R = \frac{12 \mu L}{h^3 w} \left[ 1 - \sum_{r}^{\infty} \frac{1}{r^5} \frac{192}{\pi^5} \frac{h}{w} \tanh\left(\frac{r\pi w}{2h}\right) \right]^{-1}$$

where: R is a resistance of the channel,
$R_d$ is a resistance of the droplet,
h, w, and L are the height, width and length of the channel, respectively,
μ is the bulk phase viscosity,
r is the series index which takes only odd values;
(c) calculating a flow in each channel from the current nodes using $Q_{node} = \Sigma Q_i$, where $Q_{node}$ is the flow into or out of the node and the flow in each channel is $Q = R_t/\Delta P$;
(d) calculating a velocity of the one or more droplets ($V_d$) based on the flow in the channel using $V_d = \kappa Q_i$—where slip factor (κ) is 1.4;
(e) moving each droplet through the discrete droplet microfluidic system to a next node and set the current node equal to the next node;
(f) repeating steps (b), (c), (d) and (e) until all the droplets exit the one or more outlets of the discrete droplet microfluidic system;
(g) displaying or outputting one or more results of the simulation to the one or more output devices; and
wherein steps (b), (c), (d), (e), (f) and (g) are executed by one or more processors communicably coupled to the one or more output devices.

18. The method as recited in claim 1, wherein the step of displaying or outputting the current set of data structures as designs for the discrete droplet microfluidic system comprises exporting the one or more designs for the discrete droplet microfluidic system in a computer-aided-design (CAD) format.

19. The method as recited in claim 18, wherein the discrete droplet microfluidic system is fabricated using the exported designs in the CAD format.

20. A non-transitory computer readable medium encoded with a computer program for designing a discrete droplet microfluidic system that when executed by one or more processors perform the steps comprising:
(a) creating one or more new data structures by performing one or more genetic operators on one or more selected data structures from a current set of data structures, wherein the current set of data structures comprise an initial set of droplet based networks containing a first number of droplet based networks that have been coded into the current set of data structures, and each droplet based network comprises one or more inlets, one or more outlets, two or more channels connected between the one or more inlets and the one or more outlets, and one or more bypass channels connected between the two or more channels;
(b) adding the one or more new data structures to the current set of data structures;
(c) creating a new set of data structures that satisfies one or more design parameters for the discrete droplet microfluidic system and contains at least a second number of data structures selected from the current set of data structures, wherein the second number is less than a total number of data structures within the current set of data structures, wherein a first group of the new data structures are selected using a fitness score, a second group of the new data structures are selected using a combination of the fitness score and a diversity score, and a third group of the new data structures are selected randomly, and wherein the first group of the new data structures contains approximately 10% of the second number of data structures, the second group of the new data structures contains approximately 80% of the second number of data structures, and the third group of the new data structures contains approximately 10% of the second number of data structures;
(d) replacing the current set of data structures with the new set of data structures;
(e) repeating steps (a), (b), (c) and (d) until the new set of data structures has been created a third number of times;
(f) displaying or outputting the current set of data structures as designs for the discrete droplet microfluidic system to one or more output devices communicably coupled to the one or more processors; and
wherein the discrete droplet microfluidic system is fabricated based on the displayed or outputted designs using a three-dimensional printer.

21. An apparatus for designing a discrete droplet microfluidic system comprising:
one or more processors;
a memory communicably coupled to the one or more processors;
one or more output devices communicably coupled to the one or more processors; and
wherein the one or more processors perform the steps of:
(a) creating one or more new data structures by performing one or more genetic operators on one or more selected data structures from a current set of data structures, wherein the current set of data structures comprise an initial set of droplet based networks containing a first number of droplet based networks that have been coded into the current set of data structures, and each droplet based network comprises one or more inlets, one or more outlets, two or more channels connected between the one or more inlets and the one or more outlets, and one or more bypass channels connected between the two or more channels,
(b) adding the one or more new data structures to the current set of data structures,
(c) creating a new set of data structures that satisfies one or more design parameters for the discrete droplet microfluidic system and contains at least a second number of data structures selected from the current set of data structures, wherein the second number is less than a total number of data structures within the current set of data structures, wherein a first group of the new data structures are selected using a fitness score, a second group of the new data structures are selected using a combination of the fitness score and a diversity score, and a third group of the new data structures are selected randomly, and wherein the first group of the new data structures contains approximately 10% of the second number of data structures, the second group of the new data structures contains approximately 80% of the second number of data structures, and the third group of the new data structures contains approximately 10% of the second number of data structures,
(d) replacing the current set of data structures with the new set of data structures,
(e) repeating steps (a), (b), (c) and (d) until the new set of data structures has been created a third number of times, and
(f) displaying or outputting the current set of data structures as designs for the discrete droplet microfluidic system to one or more output devices; and
wherein the discrete droplet microfluidic system is fabricated based on the displayed or outputted designs using a three-dimensional printer.

22. A computerized method for designing a discrete droplet microfluidic system comprising the steps of:
(A) providing an initial set of droplet based networks containing a first number of droplet based networks, wherein each droplet based network comprises one or more inlets, one or more outlets, two or more channels connected between the one or more inlets and the one or more outlets, and one or more bypass channels connected between the two or more channels;
(B) coding each droplet based network into a data structure such that all the data structures form a current set of data structures, and initializing a generation counter;
(C) creating one or more new data structures by:
(1) calculating a first probability,
(2) if the first probability is less than or equal to a first specified probability,
(a) selecting one of the data structures within the current set of data structures,
(b) if the generation counter is less than a fifth number of generations, creating one of the new data structures by performing a first tier mutation genetic operator on the selected data structure, and
(c) if the generation counter is equal to or greater than the fifth number of generations,
(i) calculating a second probability,
(ii) if the second probability is less than or equal to a second specified probability, creating one of the new data structures by performing a first tier mutation genetic operator on the selected data structure, and
(iii) if the second probability is greater than the second specified probability, creating one of the new data structures by performing a second tier mutation genetic operator on the selected data structure,
(3) if the first probability is greater than the first specified probability,
(a) randomly selecting a first data structure and a second data structure from the current set of data structures,
(b) creating two of the new data structures by performing a one point crossover genetic operator on the selected first data structure and the selected second data structure, (4) adding the new data structure(s) to the current set of data structures, and
(5) whenever the current set of data structures contains less than a fourth number of data structures, repeating steps (C)(1) through (C)(4);
(D) creating a new set of data structures that satisfies one or more design parameters for the discrete droplet microfluidic system and contains at least a second number of data structures, wherein the second number of data structures is less than a total number of data structures within the current set of data structures and the new set of data structures comprise a first group of data structures, a second group of data structures and a third group of data structures by:
(1) determining a fitness score and a diversity score for each data structure in the current set of data structures,
(2) selecting the first group of data structures from the current set of data structures based a highest ranking of the fitness scores for the data structures in the current set of data structures,
(3) selecting the second group of data structures from the current set of data structures based on a combination of the fitness score and the diversity score for the data structures in the current set of data structures,
(4) randomly selecting the third group of data structures from the current set of data structures, and
(5) incrementing the generation counter;
(E) wherever the generation counter is less than a third number of generations, replacing the current set of data structures with the new set of data structures, and repeating steps (C) and (D);
(F) wherever the generation counter is equal to the third number of generations, displaying or outputting the current set of data structures as designs for the discrete droplet microfluidic system to one or more output devices;
wherein steps (C), (D), (E) and (F) are executed by one or more processors communicably coupled to the one or more output devices; and
fabricating the discrete droplet microfluidic system based on the displayed or outputted designs using a three-dimensional printer.

23. The method as recited in claim 22, wherein:
the first tier mutation genetic operation adds a first bypass channel at a first randomly selected top position and a second bypass channel at a second randomly selected bottom position of the selected data structure;
the second tier mutation genetic operation either randomly adding one bypass channel to the selected data structure or randomly removing one bypass channel from the selected data structure; and
the one point crossover genetic operation creates one of the two new data structures by combining a first portion of the selected first data structure with a second portion of the selected second data structure, and creates another of the two new data structures by combining a second portion of the selected first data structure with a first portion of the selected second data structure.

24. The method as recited in claim 22, wherein:
the fourth number of data structures is approximately equal to two times the first number of droplet based networks in the initial set of droplet based networks; and
the fifth number of data structures is approximately equal to 200.

25. An apparatus for designing a discrete droplet microfluidic system comprising:
one or more processors;
a memory communicably coupled to the one or more processors;
one or more output devices communicably coupled to the one or more processors;
wherein the one or more processors perform the steps of:
(A) creating one or more new data structures from a current set of data structures, wherein the current set of data structures comprise an initial set of droplet based networks containing a first number of droplet based networks that have been coded into the current set of data structures, and each droplet based network comprises one or more inlets, one or more outlets, two or more channels connected between the one or more inlets and the one or more outlets, and one or more bypass channels connected between the two or more channels, the one or more new data structures created by:
(1) calculating a first probability,
(2) if the first probability is less than or equal to a first specified probability,
(a) selecting one of the data structures within the current set of data structures,
(b) if the generation counter is less than a fifth number of generations, creating one of the new data structures by performing a first tier mutation genetic operator on the selected data structure, and
(c) if the generation counter is equal to or greater than the fifth number of generations,
(i) calculating a second probability,
(ii) if the second probability is less than or equal to a second specified probability, creating one of the new data structures by performing a first tier mutation genetic operator on the selected data structure, and
(iii) if the second probability is greater than the second specified probability, creating one of the new data structures by performing a second tier mutation genetic operator on the selected data structure,
(3) if the first probability is greater than the first specified probability,
(a) randomly selecting a first data structure and a second data structure from the current set of data structures,
(b) creating two of the new data structures by performing a one point crossover genetic operator on the selected first data structure and the selected second data structure,
(4) adding the new data structure(s) to the current set of data structures, and
(5) whenever the current set of data structures contains less than a fourth number of data structures, repeating steps (A)(1) through (A)(4);
(B) creating a new set of data structures that satisfies one or more design parameters for the discrete droplet microfluidic system and contains at least a second number of data structures, wherein the second number of data structures is less than a total number of data structures within the current set of data structures and the new set of data structures comprise a first group of data structures, a second group of data structures and a third group of data structures by:

(1) determining a fitness score and a diversity score for each data structure in the current set of data structures,
(2) selecting the first group of data structures from the current set of data structures based a highest ranking of the fitness scores for the data structures in the current set of data structures,
(3) selecting the second group of data structures from the current set of data structures based on a combination of the fitness score and the diversity score for the data structures in the current set of data structures,
(4) randomly selecting the third group of data structures from the current set of data structures, and
(5) incrementing the generation counter;
(C) wherever the generation counter is less than a third number of generations, replacing the current set of data structures with the new set of data structures, and repeating steps (A) and (B);
(D) wherever the generation counter is equal to the third number of generations, displaying or outputting the current set of data structures as designs for the discrete droplet microfluidic system to the one or more output devices; and
wherein the discrete droplet microfluidic system is fabricated based on the displayed or outputted designs using a three-dimensional printer.

* * * * *